US009522832B2

(12) United States Patent
Furuya et al.

(10) Patent No.: US 9,522,832 B2
(45) Date of Patent: Dec. 20, 2016

(54) WASTEWATER TREATMENT APPARATUS, WASTEWATER TREATMENT METHOD, WASTEWATER TREATMENT SYSTEM, CONTROL DEVICE, AND CONTROL METHOD

(71) Applicant: METAWATER CO., LTD., Tokyo (JP)

(72) Inventors: Yuji Furuya, Tokyo (JP); Shigehiro Suzuki, Tokyo (JP); Nobuki Tsuboi, Tokyo (JP); Hiroyuki Takahashi, Tokyo (JP); Noriaki Inagaki, Tokyo (JP); Tsutomu Wada, Tokyo (JP); Makoto Maeda, Tokyo (JP)

(73) Assignee: METAWATER CO., LTD., Tokyo (JP)

( * ) Notice: Subject to any disclaimer, the term of this patent is extended or adjusted under 35 U.S.C. 154(b) by 110 days.

(21) Appl. No.: 14/481,566

(22) Filed: Sep. 9, 2014

(65) Prior Publication Data

US 2014/0374346 A1 Dec. 25, 2014

Related U.S. Application Data

(63) Continuation of application No. PCT/JP2013/056693, filed on Mar. 11, 2013.

(30) Foreign Application Priority Data

Mar. 9, 2012 (JP) .................................. 2012-053782

(51) Int. Cl.
*C02F 3/30* (2006.01)
*C02F 3/00* (2006.01)
(Continued)

(52) U.S. Cl.
CPC ............. *C02F 3/305* (2013.01); *C02F 3/006* (2013.01); *C02F 3/20* (2013.01); *C02F 3/302* (2013.01);
(Continued)

(58) Field of Classification Search
CPC ............. C02F 3/305; C02F 3/006; C02F 3/20; C02F 2209/001; C02F 2209/15; C02F 2209/38; C02F 2101/16; C02F 3/302; C02F 2209/003; C02F 2209/006; C02F 2209/005; Y10T 137/0363; Y10T 137/2499; Y02W 10/15
(Continued)

(56) References Cited

U.S. PATENT DOCUMENTS 5,480,548 A 1/1996 Daigger et al.
6,093,322 A * 7/2000 Bongards ................ C02F 3/006
210/614

(Continued)

FOREIGN PATENT DOCUMENTS

CN 1640826 A 7/2005
JP 59-012797 A 1/1984
(Continued)

OTHER PUBLICATIONS

First Office Action issued in corresponding Chinese Patent Application No. 201380013201.9, mailed on Jul. 1, 2015; 16 pages with English translation.
(Continued)

*Primary Examiner* — Fred Prince
(74) *Attorney, Agent, or Firm* — McDermott Will & Emery LLP

(57) ABSTRACT

A wastewater treatment apparatus includes: an air diffusing unit that supplies gas to nitrogen-containing water, so that ammonia contained in the nitrogen-containing water is nitrified to nitrate according to a flow of the water, and each desired proportion of the nitrate is denitrified at each position along the flow direction; a denitrification confirming unit provided at a halfway position between an upstream-side denitrification zone for obtaining a requisite minimum
(Continued)

denitrified nitrogen amount and a downstream-side nitrification zone for obtaining ultimately required nitrified water quality, which follows the upstream-side denitrification zone on a downstream side thereof; and a gas supply-amount control unit that controls a gas supply amount from the air diffusing unit at least on an upstream side of the denitrification confirming unit, so that a desired proportion of the nitrate is denitrified at the halfway position, based on the denitrification state confirmed by the denitrification confirming unit.

18 Claims, 13 Drawing Sheets

(51) Int. Cl.
 *C02F 3/20* (2006.01)
 *C02F 101/16* (2006.01)
(52) U.S. Cl.
 CPC ...... *C02F 2101/16* (2013.01); *C02F 2209/001* (2013.01); *C02F 2209/003* (2013.01); *C02F 2209/005* (2013.01); *C02F 2209/006* (2013.01); *C02F 2209/15* (2013.01); *C02F 2209/38* (2013.01); *Y02W 10/15* (2015.05); *Y10T 137/0363* (2015.04); *Y10T 137/2499* (2015.04)
(58) Field of Classification Search
 USPC ................ 210/605, 614, 621, 623, 630, 903
 See application file for complete search history.

(56) References Cited

U.S. PATENT DOCUMENTS

| 7,153,429 B1* | 12/2006 | Pedros | C02F 3/006 210/143 |
|---|---|---|---|
| 2006/0131232 A1* | 6/2006 | Rosen | C02F 3/006 210/614 |
| 2006/0254979 A1 | 11/2006 | Koopmans et al. | |

FOREIGN PATENT DOCUMENTS

| JP | 4-110198 U | 9/1992 |
|---|---|---|
| JP | H07-136687 A | 5/1995 |
| JP | 2001-353496 A | 12/2001 |
| JP | 2005-000715 A | 1/2005 |
| JP | 2005-193236 A | 7/2005 |
| JP | 2005-199116 A | 7/2005 |
| JP | 2006-055683 A | 3/2006 |
| JP | 2006-255514 A | 9/2006 |
| JP | 2008-221162 A | 9/2008 |
| JP | 4381473 B1 | 12/2009 |
| JP | 2011-005354 A | 1/2011 |
| JP | 2011-218346 A | 11/2011 |
| WO | 2011/148949 A1 | 12/2011 |

OTHER PUBLICATIONS

International Search Report dated Jun. 11, 2013 issued in Application No. PCT/JP2013/056693, with English translation.
Extended Search Report issued in corresponding European Patent Application No. 13757474.5, mailed on Sep. 25, 2015.
Second Office Action issued in corresponding Chinese Patent Application No. 201380013201.9, mailed on Mar. 8, 2016; with English translation.

* cited by examiner

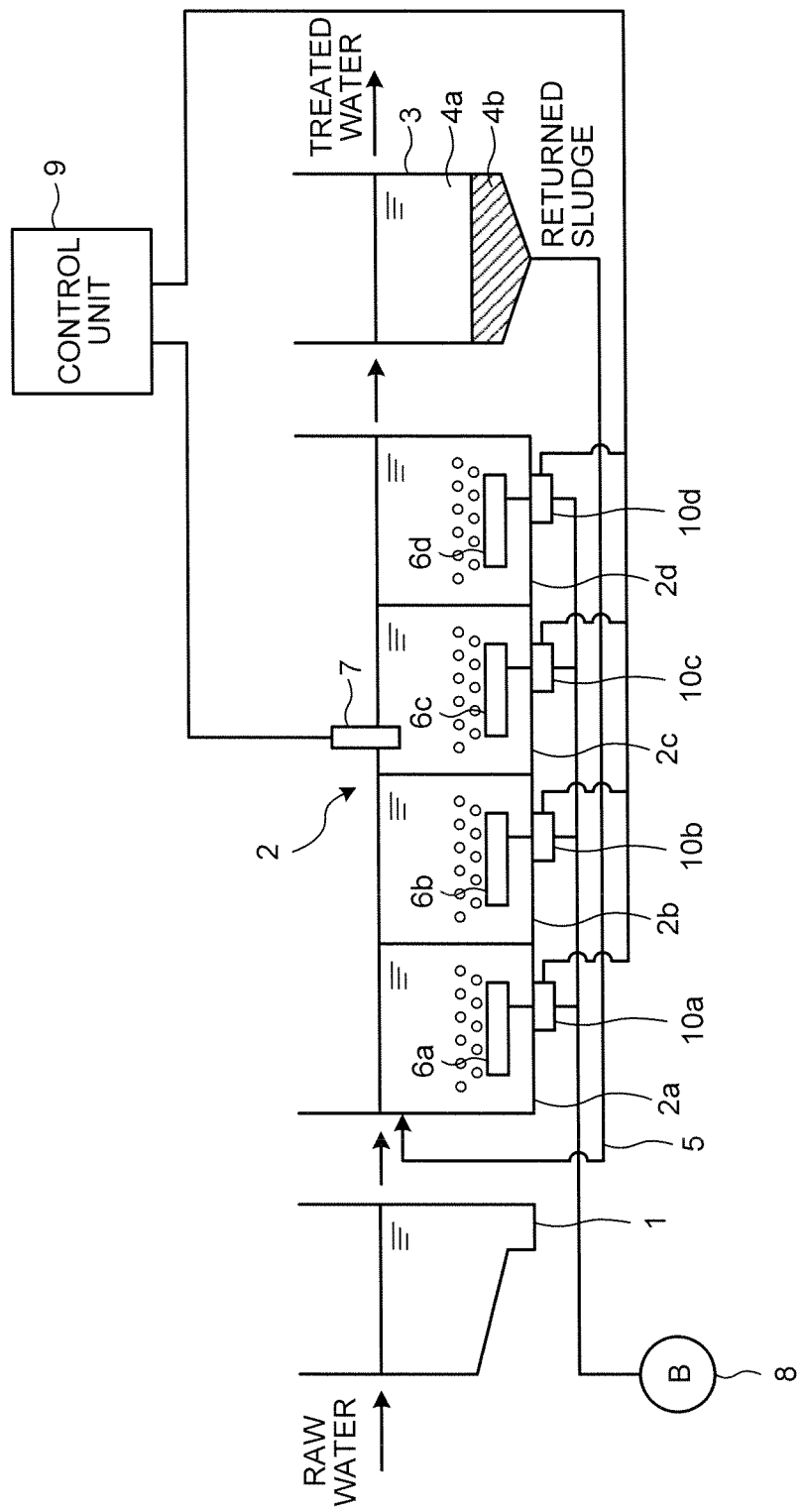

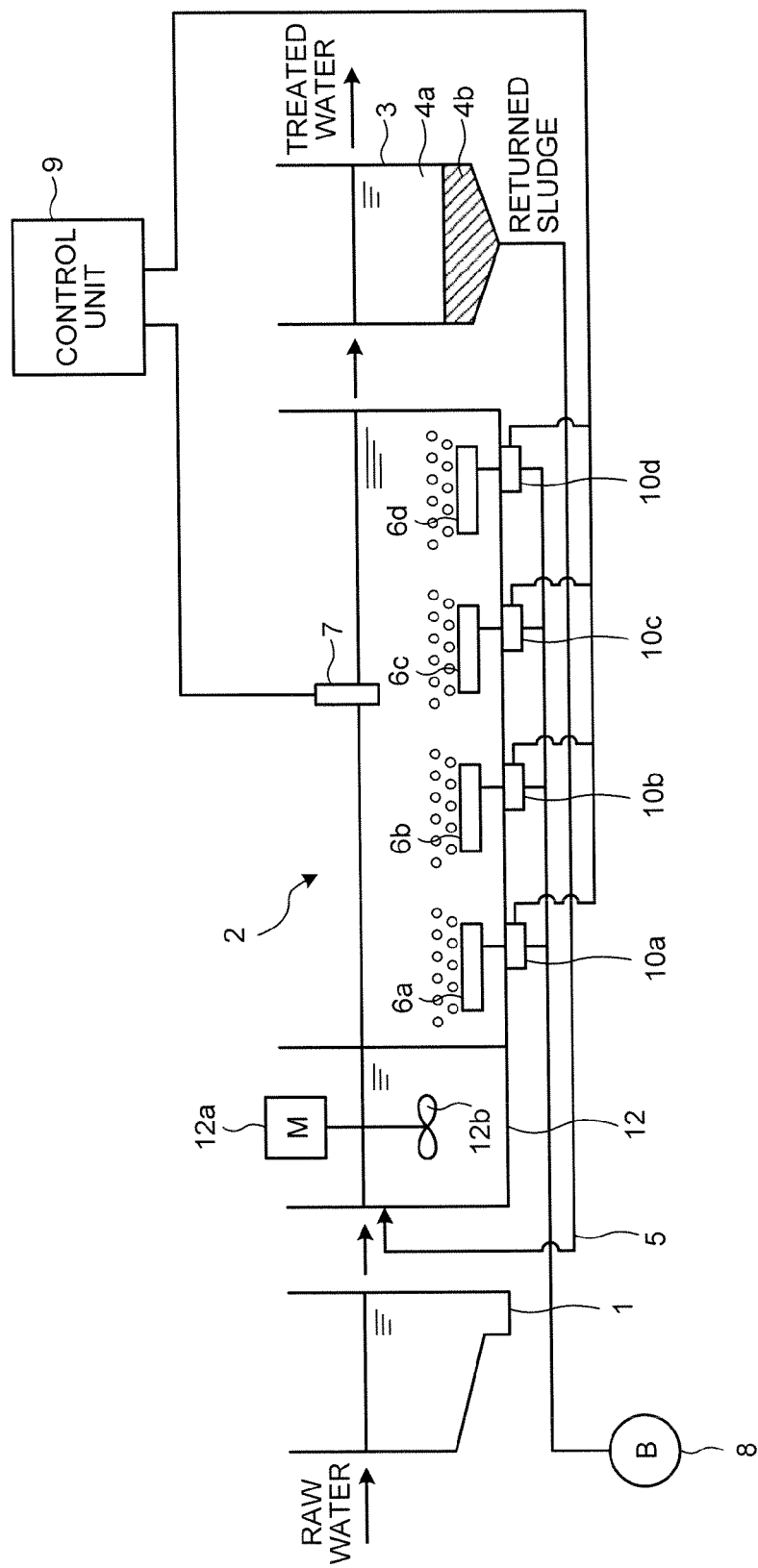

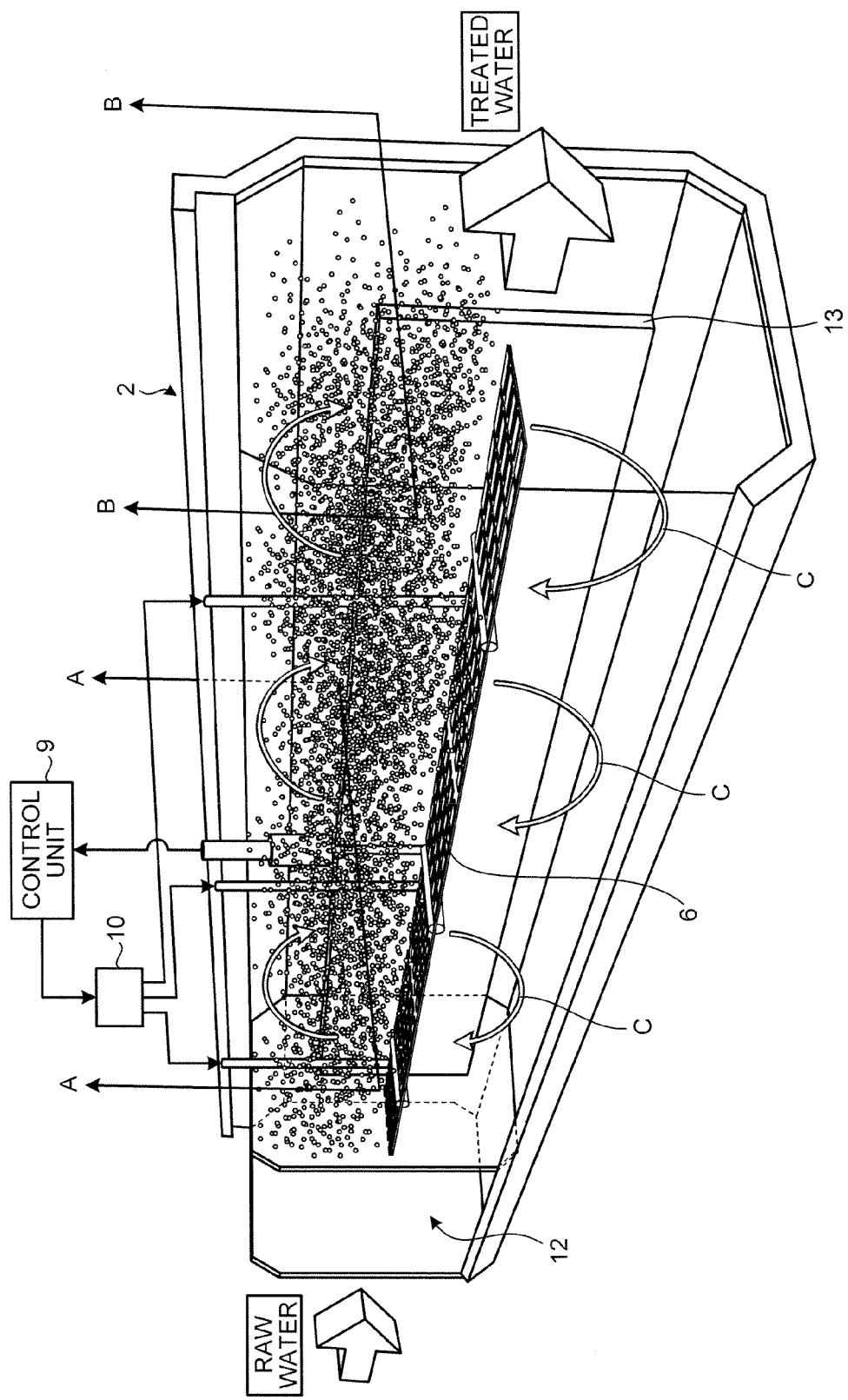

WASTEWATER TREATMENT APPARATUS, WASTEWATER TREATMENT METHOD, WASTEWATER TREATMENT SYSTEM, CONTROL DEVICE, AND CONTROL METHOD

CROSS-REFERENCE TO RELATED APPLICATIONS

This application is a continuation of PCT International Application No. PCT/JP2013/056693 filed on Mar. 11, 2013 which claims the benefit of priority from Japanese Patent Application No. 2012-053782 filed on Mar. 9, 2012, the entire contents of which are incorporated herein by reference.

BACKGROUND OF THE INVENTION

1. Field of the Invention

The present invention relates to a wastewater treatment apparatus, a wastewater treatment method, and a wastewater treatment system that control an aeration amount in an aerobic tank, and a control device, a control method, and a program stored in a non-transitory computer-readable recording medium.

2. Description of the Related Art

Conventionally, as a sewage treatment system that treats sewage such as household wastewater or industrial wastewater, various sewage treatment systems using a standard activated sludge method or using a trickling filter method have been put to practical use.

In the sewage treatment system using the standard activated sludge method, aeration treatment is performed to supply oxygen to various kinds of aerobic microorganisms present in a reaction tank, while causing sewage to be treated to flow into the reaction tank. Accordingly, organic matter contained in the sewage in the reaction tank is decomposed by an action of the aerobic microorganisms, thereby enabling to obtain stable quality of treated water.

In the aeration treatment in the reaction tank, influent proportional control, DO (dissolved oxygen) control, or ammonia control is executed with respect to an air diffuser that performs aeration (see Japanese Patent Application Laid-open Publication No. 2005-199116). The influent proportional control uses a flowmeter installed on an inflow side of the reaction tank, to supply air to the air diffuser in an amount proportional to an amount of influent flowing into the reaction tank. The DO control uses a dissolved oxygen analyzer (DO analyzer) installed at a terminal on an outflow side of the reaction tank to measure a dissolved oxygen concentration, and supplies air to the air diffuser so that the dissolved oxygen concentration is maintained at a predetermined concentration. The ammonia control uses an ammonia meter installed at the terminal on the outflow side of the reaction tank to supply air to the air diffuser so that ammonia nitrogen ($NH_4$—N) at the terminal of the reaction tank is maintained at a predetermined concentration.

SUMMARY OF THE INVENTION

It is an object of the present invention to at least partially solve the problems in the conventional technology.

A wastewater treatment apparatus according to one aspect of the present invention, includes: an air diffusing unit that supplies gas to nitrogen-containing water throughout substantially a whole area in a flow direction of the nitrogen-containing water, so that ammonia contained in the nitrogen-containing water is nitrified to nitrate according to a flow of the nitrogen-containing water in a reaction tank, and each desired proportion of the nitrate is denitrified at each position along the flow direction; a denitrification confirming unit provided at a halfway position along the flow direction of the nitrogen-containing water between an upstream-side denitrification zone for obtaining a requisite minimum denitrified nitrogen amount and a downstream-side nitrification zone for obtaining ultimately required nitrified water quality, which follows the upstream-side denitrification zone on a downstream side thereof, to confirm whether a desired proportion of the nitrate generated at the halfway position has been denitrified; and a gas supply-amount control unit that controls a gas supply amount from the air diffusing unit at least on an upstream side of the denitrification confirming unit along the flow direction of the nitrogen-containing water, so that a desired proportion of the nitrate is denitrified at the halfway position, based on the denitrification state confirmed by the denitrification confirming unit.

A wastewater treatment method according to another aspect of the present invention, includes: a biological treatment step of performing biological treatment by nitrification reaction and denitrification reaction with respect to nitrogen-containing water flowing in a reaction tank; an air diffusing step of supplying gas to the nitrogen-containing water throughout substantially a whole area in a flow direction of the nitrogen-containing water, so that ammonia contained in the nitrogen-containing water is nitrified to nitrate according to a flow of the nitrogen-containing water, and each desired proportion of nitrate is denitrified at each position along the flow direction; a denitrification confirming step of confirming a denitrification state whether the desired proportion of nitrate has been denitrified at a halfway position along the flow direction of the nitrogen-containing water between an upstream-side denitrification zone for obtaining a requisite minimum denitrified nitrogen amount and a downstream-side nitrification zone for obtaining ultimately required nitrified water quality, which follows the upstream-side denitrification zone on a downstream side thereof; and a gas supply-amount control step of controlling a gas supply amount at least on an upstream side of the halfway position along the flow direction of the nitrogen-containing water, so that the desired proportion of nitrate is denitrified at the halfway position based on the denitrification state confirmed at the denitrification confirming step.

A wastewater treatment system according to still another aspect of the present invention, includes: a denitrification confirming unit provided at a halfway position along a flow direction of nitrogen-containing water between an upstream-side denitrification zone for obtaining a requisite minimum denitrified nitrogen amount and a downstream-side nitrification zone for obtaining ultimately required nitrified water quality, which follows the upstream-side denitrification zone on a downstream side thereof, to confirm a denitrification state whether a desired proportion of nitrate has been denitrified at the halfway position with respect to the nitrogen-containing water to which gas is supplied throughout substantially a whole area in the flow direction, so that ammonia contained in the nitrogen-containing water is nitrified to nitrate according to the flow direction and each desired proportion of nitrate is denitrified at each position along the flow direction; and a gas supply-amount control unit that controls a gas supply amount to be supplied to the nitrogen-containing water at least on an upstream side of the denitrification confirming unit along the flow direction of the nitrogen-containing water, so that the desired proportion of nitrate is denitrified at the halfway position, based on the denitrification state confirmed by the denitrification confirming unit.

A control device according to still another aspect of the present invention controls a gas supply amount with respect to an air diffusing unit that supplies gas to nitrogen-containing water throughout substantially a whole area in a flow direction of the nitrogen-containing water, so that ammonia contained in the nitrogen-containing water is nitrified to nitrate according to the flow of the nitrogen-containing water, and each desired proportion of nitrate is denitrified at each position along the flow direction, at least on an upstream side along the flow direction of the nitrogen-containing water than a denitrification confirming unit that is provided at a halfway position along the flow direction of the nitrogen-containing water between an upstream-side denitrification zone for obtaining a requisite minimum denitrified nitrogen amount and a downstream-side nitrification zone for obtaining ultimately required nitrified water quality, which follows the upstream-side denitrification zone on a downstream side thereof, to confirm a denitrification state whether the desired proportion of nitrate has been denitrified at the halfway position, so that the desired proportion of nitrate is denitrified at the halfway position based on the denitrification state at the halfway position confirmed by the denitrification confirming unit.

A control method according to still another aspect of the present invention, in which, the control method performed by a control device controls a gas supply amount with respect to nitrogen-containing water, the control method includes: a denitrification confirming step of confirming a denitrification state whether a desired proportion of nitrate has been denitrified with respect to the nitrogen-containing water to which gas is supplied throughout substantially a whole area in a flow direction of the nitrogen-containing water, so that ammonia contained in the nitrogen-containing water is nitrified to nitrate according to the flow direction at a halfway position along the flow direction of the nitrogen-containing water between an upstream-side denitrification zone for obtaining a requisite minimum denitrified nitrogen amount and a downstream-side nitrification zone for obtaining ultimately required nitrified water quality, which follows the upstream-side denitrification zone on a downstream side thereof, and each desired proportion of nitrate is denitrified at each position along the flow direction; and a gas supply-amount control step of controlling a gas supply amount to be supplied to the nitrogen-containing water at least on an upstream side of the halfway position along the flow direction of the nitrogen-containing water, so that the desired proportion of nitrate is denitrified at the halfway position based on the denitrification state confirmed at the denitrification confirming step.

A program stored in a non-transitory computer-readable recording medium according to still another aspect of the present invention that causes a computer to execute: a denitrification confirming step of confirming a denitrification state whether a desired proportion of nitrate has been denitrified with respect to nitrogen-containing water to which gas is supplied throughout substantially a whole area in a flow direction of the nitrogen-containing water, so that ammonia contained in the nitrogen-containing water is nitrified to nitrate according to the flow direction at a halfway position along the flow direction of the nitrogen-containing water between an upstream-side denitrification zone for obtaining a requisite minimum denitrified nitrogen amount and a downstream-side nitrification zone for obtaining ultimately required nitrified water quality, which follows the upstream-side denitrification zone on a downstream side thereof, and each desired proportion of nitrate is denitrified at each position along the flow direction; and a gas supply-amount control step of controlling a gas supply amount to be supplied to the nitrogen-containing water at least on an upstream side of the halfway position along the flow direction of the nitrogen-containing water, so that the desired proportion of nitrate is denitrified at the halfway position based on the denitrification state confirmed at the denitrification confirming step.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a configuration diagram of a wastewater treatment apparatus according to a first embodiment of the present invention;

FIG. 5 is a configuration diagram showing a wastewater treatment apparatus according to a second embodiment of the present invention;

FIG. 6 is a perspective transparent view showing a reaction tank according to a third embodiment of the present invention;

DETAILED DESCRIPTION OF THE PREFERRED EMBODIMENTS

Figure 2A:
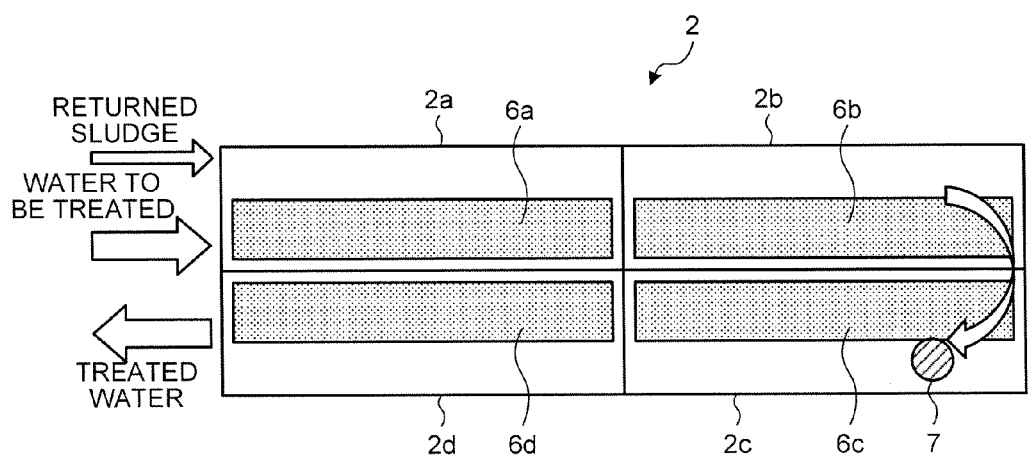
FIG. 2A is a plan view showing a reaction tank in the wastewater treatment apparatus according to the first embodiment of the present invention.

Embodiments of the present invention will be explained below with reference to the accompanying drawings. In all the drawings of the following embodiments, identical or corresponding elements are given same reference signs. In addition, the present invention is not limited to the embodiments explained below.

Meanwhile, in the various types of control described above, there were the following problems. That is, in the influent proportional control, because organic loading and ammonia loading of the nitrogen-containing influent vary to fluctuate the water quality, if the amount of air is controlled in proportion to an amount of influent, excess or shortage will occur in the amount of air inevitably. Furthermore, in the DO control, organic loading or ammonia loading of the nitrogen-containing influent varies, and when loading thereof decreases, the amount of air is likely to be excessive. On the other hand, when the loading increases, the amount of air is likely to become insufficient. Further, in the ammonia control, although an appropriate amount of air can be supplied to the air diffuser according to the ammonia loading of the nitrogen-containing influent, it was difficult to control denitrification treatment in a previous stage of the ammonia control.

In contrast, according to the embodiment described below, it is possible to provide an advantage that a wastewater treatment apparatus, a wastewater treatment method, and a wastewater treatment system that can supply an appropriate amount of oxygen to a reaction tank, can control denitrification treatment appropriately, and can improve a nitrogen removal rate, thereby improving the quality of treated water, by appropriately controlling a gas supply amount (an aeration amount) according to the loading of the nitrogen-containing water flowing into the reaction tank where aeration is performed, and a control device, a control method, and a program stored in a non-transitory computer-readable recording medium.

At first, a configuration of a wastewater treatment apparatus including a control device according to a first embodiment of the present invention is explained. FIG. 1 is a schematic diagram showing a configuration of the wastewater treatment apparatus according to the first embodiment of the present invention. As shown in FIG. 1, the wastewater treatment apparatus according to the first embodiment of the present invention includes a primary sedimentation tank 1, a reaction tank 2 including a plurality of stages of aerobic tanks 2a, 2b, 2c, and 2d (first to fourth tanks) sequentially connected to each other, a solid-liquid separation tank 3, a sludge returning path 5, and a control unit 9.

Nitrogen-containing raw water (hereinafter, "raw water") flows into the primary sedimentation tank 1. In the primary sedimentation tank 1, raw water is caused to flow gently to settle dirt having a comparatively small particle size.

Water to be treated, which is nitrogen-containing water flowing out from the primary sedimentation tank 1, flows into the reaction tank 2. The plurality of stages of the aerobic tanks 2a to 2d constituting the reaction tank 2 are arranged along a flow direction of the water to be treated. In some cases, a BOD oxidation area may be generated on an inflow side of the water to be treated in the reaction tank 2. Furthermore, the aerobic tanks 2a to 2d include air diffuser units 6a, 6b, 6c, and 6d respectively as air diffusing units. The air diffuser units 6a to 6d perform air diffusion into the respective aerobic tanks 2a to 2d by using gas such as air supplied by a blower 8 to aerate activated sludge retained therein. In the respective aerobic tanks 2a to 2d, ammonia nitrogen contained in the water to be treated under an aerobic condition is mainly nitrified to nitrite-nitrogen and nitrate-nitrogen. The aerobic tanks 2a to 2d provided with the air diffuser units 6a to 6d, respectively, can be arranged linearly, or as shown in FIG. 2A, which is a plan view of an example of the reaction tank 2, can be arranged as a bypass channel, which is folded back halfway.

In addition, as shown in FIG. 1, the air diffuser units 6a to 6d are provided with gas supply-amount control units 10a, 10b, 10c, and 10d respectively as a part of a gas supply-amount control unit constituting the control device. Each of the respective gas supply-amount control units 10a to 10d includes an airflow control valve and the like, and controls the gas supply amount from the air diffuser units 6a to 6d in the respective aerobic tanks 2a to 2d uniformly or individually according to a control signal from the control unit 9 as a part of the gas supply-amount control unit constituting the control device.

The control unit 9 as the control device includes a computer (PC) including, for example, a CPU, a storage medium such as a ROM or a RAM or the like, and a recording medium such as a hard disk or the like, in which is a non-transitory computer-readable recording medium executed by a computer. In the control unit 9, a predetermined program capable of executing a wastewater treatment method and a control method described later is stored in the recording medium. As described later, the control unit 9 responds to a confirmation signal such as input measurement value data or the like of a nitrate concentration, to output a control signal according to a program stored therein, thereby controlling the gas supply-amount control units 10a to 10d to control the gas supply amount from the air diffuser units 6a to 6d.

A nitrate meter 7 is provided at a desired position along a flow of the water to be treated in the reaction tank 2. The nitrate meter 7 as a denitrification confirming unit is a nitrate concentration measuring unit that measures the nitrate concentration of the water to be treated at the desired position for controlling denitrification. In the first embodiment, the nitrate meter 7 is installed at, for example, an inflow position of the aerobic tank 2c, which is substantially at an intermediate position of the reaction tank 2. Herein as an installation position of the nitrate meter 7, the nitrate meter 7 can be installed at a desired position, and since the nitrate meter 7 is used for control of the denitrification reaction as described later, it is desirable to install the nitrate meter 7 on a downstream side of a position where a removal amount of nitrogen desired to be removed by the denitrification reaction can be ensured and on an upstream side of a position where the nitrification reaction can be sufficiently performed in the reaction tank 2. Furthermore, the installation position of the nitrate meter 7 can be determined based on dependencies regarding a total nitrogen concentration, and concentrations of nitrate-nitrogen, nitrite-nitrogen, and ammonia nitrogen measured beforehand, on the position of the reaction tank 2. Thereby, a wastewater treatment system is constituted by the control unit 9, the gas supply-amount control unit 10, and the nitrate meter 7.

It should be noted that, nitrate in the present specification is a concept including nitrate ($NO_3^-$), nitrite ($NO_2^-$), nitrate-nitrogen ($NO_3$—N), nitrite-nitrogen ($NO_2$—N), the sum of nitrate-nitrogen and nitrite-nitrogen, and NO indicating both nitrate and nitrite. In addition, ammonia in the present specification is a concept including ammonia and ammonia nitrogen. That is, the nitrate concentration in the present specification can be any concentration of nitrate, nitrite, nitrate-nitrogen, nitrite-nitrogen, the sum of nitrate-nitrogen and nitrite-nitrogen, and NO indicating both nitrate and nitrite. An ammonia concentration can be any concentration of ammonia ($NH_3$) and ammonia nitrogen ($NH_4$—N).

Even in case where the plurality of stages of the aerobic tanks 2a to 2d constituting the reaction tank 2 are arranged by being folded back as shown in FIG. 2A, the nitrate meter 7 is provided at a desired position along the flow of the water to be treated in the reaction tank 2, for example, at the inflow position of the aerobic tank 2c. It should be noted that, the details of the installation position of the nitrate meter 7 will be described later.

In addition, as shown in FIG. 1, the nitrate meter 7 supplies the measured nitrate concentration value to the control unit 9. The control unit 9 supplied with the measured nitrate concentration value supplies a control signal to the gas supply-amount control units 10a to 10d, to control the amount of gas supplied from the air diffuser units 6a to 6d based on the nitrate concentration value. That is, the control unit 9 and the gas supply-amount control units 10a to 10d constitute the gas supply-amount control unit, which is the control device. It should be noted that, details of the installation position of the nitrate meter 7 and the control by the control unit 9 will be described later.

The water to be treated flowing out from the aerobic tank 2d on the most downstream side flows into the solid-liquid separation tank 3. In the solid-liquid separation tank 3, the water to be treated is separated into a separate liquid 4a and an activated sludge 4b. A pipe (not shown) is connected to a side wall of the solid-liquid separation tank 3, and it is configured so that the separate liquid 4a is fed to a sterilization treatment process via the pipe. In addition, the sludge returning path 5 is connected to the bottom of the solid-liquid separation tank 3, and it is configured so that the activated sludge 4b accumulated at the bottom of the solid-liquid separation tank 3 can be returned to the aerobic tank 2a. Accordingly, biomass in the aerobic tank 2a and in the aerobic tanks 2b, 2c, and 2d on the downstream side thereof can be maintained at a predetermined amount.

Figure 4:
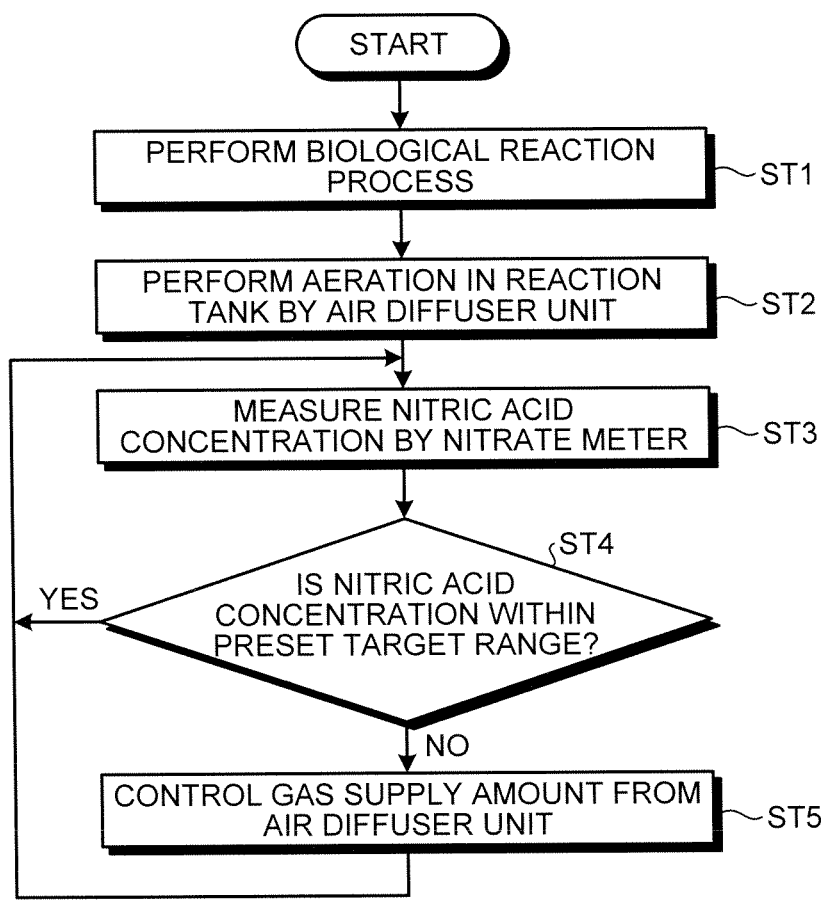
FIG. 4 is a flowchart showing a wastewater treatment method according to the first embodiment of the present invention.

The wastewater treatment method performed in the aerobic tanks 2a to 2d, and the control method associated therewith and control of the gas supply amount by the program executed by the control unit 9 are explained next. FIG. 4 is a flowchart showing the treatment method according to the first embodiment.

In the wastewater treatment method performed in the aerobic tanks 2a to 2d, at first, the water to be treated from the primary sedimentation tank 1 shown in FIG. 1 is sequentially fed to the aerobic tanks 2a to 2d. In each of the aerobic tanks 2a to 2d, ammonia nitrogen ($NH_4$—N) in the water to be treated is nitrified to nitrite-nitrogen ($NO_2$—N) and nitrate-nitrogen ($NO_3$—N) as shown by the following reaction formulae (1) to (3) by nitrification bacteria, which are aerobic microorganisms in the activated sludge, under the aerobic condition (in FIG. 4, Steps ST1 and ST2).

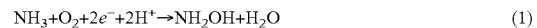

$$NH_3+O_2+2e^-+2H^+\rightarrow NH_2OH+H_2O \qquad (1)$$

$$NH_2OH+H_2O\rightarrow NO_2^-+5H^++4e^- \qquad (2)$$

$$NO_2^-+0.5O_2\rightarrow NO_3^- \qquad (3)$$

Meanwhile, the denitrification reaction (an anaerobic reaction) by denitrification bacteria occurs in an area having a small amount of oxygen, even in an area where the amount of oxygen is small in the water to be treated in the reaction tank 2 or in a nitrification tank according to circumstances. Therefore, if a sufficient carbon source is supplied to the area where the denitrification reaction occurs (a denitrification reaction area), the denitrification reaction can be promoted sufficiently. As a result, an area in which the denitrification reaction is partially performed is generated in the reaction tank 2. Accordingly, as shown in the following reaction formulae (4) to (10), nitrous oxide ($N_2O$) gas generated due to insufficient nitrification is decomposed or nitrite is reduced without generating any nitrous oxide, or decomposition into nitrogen and carbon dioxide is performed, thereby enabling to remove nitrogen.

$$NO_2+3H^++2e^-\rightarrow 0.5N_2O+1.5H_2O \qquad (4)$$

$$NO_2^-+H^++2(H)\rightarrow 0.5N_2O1.5H_2O \qquad (5)$$

$$NO_3^-+H^++5(H)\rightarrow 0.5N_2+H_2O \qquad (6)$$

$$NO_3^-+2H\rightarrow NO_2^-+H_2O \qquad (7)$$

$$NO_2+H^++(H)\rightarrow NO+H_2O \qquad (8)$$

$$NO+(H)\rightarrow 0.5N_2O+0.5H_2O \qquad (9)$$

$$N_2O+2(H)\rightarrow N_2+H_2O \qquad (10)$$

Figure 3:
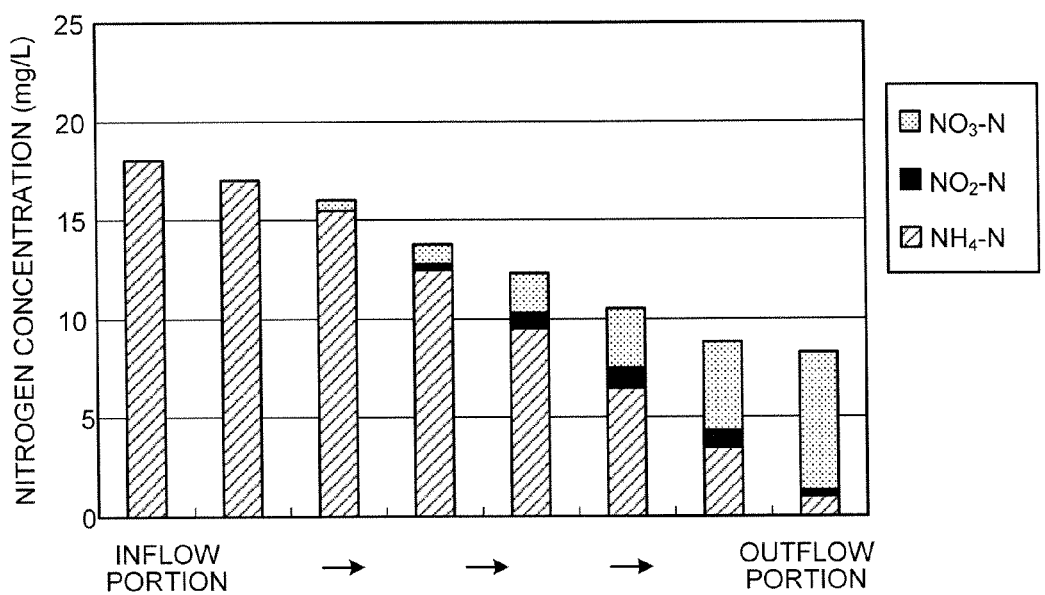
FIG. 3 is a graph showing a nitrogen concentration in $NH_4$—N, $NO_2$—N, and $NO_3$—N and a total nitrogen concentration thereof measured along a flow of water to be treated in the reaction tank.

Herein the present inventors have measured each nitrogen concentration in ammonia nitrogen ($NH_4$—N), nitrite-nitrogen ($NO_2$—N), and nitrate-nitrogen ($NO_3$—N) at a plurality of positions and a total nitrogen concentration thereof obtained by adding these, along a direction from the inflow side of the aerobic tank 2a to the outflow side of the aerobic tank 2d in the reaction tank 2, that is, along the flow direction of the water to be treated, for a case where the denitrification reaction and the nitrification reaction proceed in parallel. FIG. 3 is a graph representing a result of measurement of a nitrogen concentration in $NH_4$—N, $NO_2$—N, and $NO_3$—N and a total nitrogen concentration thereof measured at the position of the reaction tank 2.

As shown in FIG. 3, the nitrogen concentration in $NO_2$—N and $NO_3$—N does not increase so much and the total nitrogen concentration decreases according to the flow of the water to be treated from the position on the inflow side of the aerobic tank 2a, which is relatively on the first half side of the reaction tank 2, to the position on the outflow side of the aerobic tank 2b. It is considered this is because the nitrification reaction area and the denitrification reaction area are present in the aerobic tanks 2a and 2b on an upstream side of the reaction tank 2, and the nitrification treatment in the nitrification reaction area and the denitrification treatment in the denitrification reaction area simultaneously proceed to improve a nitrogen removal rate. In addition, the nitrogen concentration in $NO_2$—N and $NO_3$—N increases from the position on the inflow side of the aerobic tank 2c, which is relatively on the latter half side of the reaction tank 2, to the position on the outflow side of the aerobic tank 2d. That is, the present inventors have considered that the denitrification reaction continuously proceeds and the nitrification reaction rapidly proceeds in the aerobic tanks 2c and 2d on a downstream side of the reaction tank 2. Therefore, the present inventors was reminded of that, if the nitrate meter 7 is installed at a desired position at first where the nitrogen concentration decreases in the reaction tank 2 to control the gas supply amount at least on an upstream side of the nitrate meter 7 substantially uniformly or individually based on the nitrate concentration at the position, both the denitrification reaction and the nitrification reaction generated on the upstream side of the nitrate meter 7 can be controlled.

Specifically, the present inventors have found that each desired proportion of nitrate generated by nitrification at each position in the flow direction of the water to be treated in the reaction tank 2 can be denitrified by supplying gas to the water to be treated in the reaction tank 2 throughout substantially the whole area in the flow direction, so that ammonia ($NH_4$) contained in the water to be treated is gradually nitrified to nitrate (nitrite-nitrogen ($NO_2$—N) and nitrate-nitrogen ($NO_3$—N)) by the air diffuser units 6a to 6d, as the water to be treated flows down in the reaction tank 2. Accordingly, the present inventors have found that the denitrification reaction and the nitrification reaction on the upstream side of the nitrate meter 7 can be controlled by installing the nitrate meter 7 at a desired position and controlling the gas supply amount from the air diffuser units 6 at least on the upstream side of the nitrate meter 7 uniformly or individually so that the measurement value measured by the nitrate meter 7 falls within a predetermined range.

Therefore, in the present invention, the control unit 9 first monitors a measurement of the nitrate concentration by the nitrate meter 7 installed on the inflow side of the aerobic tank 2c, and controls the gas supply-amount control units 10a and 10b at least on the upstream side of the nitrate meter 7 along the flow direction of the water to be treated. Furthermore, in the present invention, the gas supply-amount control units 10a to 10d adjust the gas supply amount in the reaction tank 2, that is, the gas supply amount in each of the aerobic tanks 2a to 2d. In this case, when it is taken into consideration that the denitrification reaction in the reaction tank 2 is controlled, it is desirable to install the nitrate meter 7 at a position where control of the denitrification reaction is desired in the area where both the denitrification reaction and the nitrification reaction occur together, for example, near the most downstream side of the area in the reaction tank 2 where it is required to promote the denitrification reaction while suppressing generation of nitrate by the nitrification reaction.

Therefore, in the first embodiment, it is desirable to install the nitrate meter 7 on the inflow side of the aerobic tank 2c. The control unit 9 controls at least the gas supply-amount control units 10a and 10b on the upstream side of the nitrate meter 7 along the flow direction of the water to be treated, so that a total nitrate concentration of $NO_2$—N and $NO_3$—N measured by the nitrate meter 7 falls within a preset target range. The control unit 9 supplies a control signal to the gas supply-amount control units 10c and 10d as required. Accordingly, the control unit 9 controls the gas supply amount in the aerobic tanks 2a and 2b, and further, in the aerobic tanks 2c and 2d individually or substantially uniformly. When denitrification of the desired proportion of nitrate generated due to nitrification by the nitrification reaction cannot be confirmed by the nitrate meter 7, the control unit 9 individually or uniformly executes control to increase or decrease the gas supply amount from the air diffuser units 6a and 6b at least on the upstream side of the nitrate meter 7 along the flow direction of the water to be treated. In addition, by controlling the gas supply amount by the control unit 9, the denitrification reaction can be promoted while suppressing the nitrification reaction in the water to be treated on the upstream side of the nitrate meter 7 in the reaction tank 2. Because the amount of dissolved oxygen in the water to be treated increases along the flow of the water to be treated from the upstream side toward the downstream side, the water to be treated is in a better aerobic condition while the denitrification reaction proceeds on a downstream side of the nitrate meter 7, thereby promoting the nitrification reaction rapidly to decrease ammonia ($NH_4$) rapidly and increase the concentration of nitrate (nitrite-nitrogen ($NO_2$—N) and nitrate-nitrogen ($NO_3$—N)) rapidly. It should be noted that, in control of the gas supply amount, as described later, aeration can be performed continuously or intermittently including stop control of aeration, designating the gas supply amount to be 0.

Specifically, the nitrate meter 7 measures the total nitrate concentration of $NO_2$—N and $NO_3$—N on the inflow side of the aerobic tank 2c (in FIG. 4, Step ST3). The nitrate meter 7 supplies a measurement value of the nitrate concentration to the control unit 9. The control unit 9 determines whether the supplied value of the nitrate concentration is within a predetermined range, that is, within the preset target range (a set target range), for example, 5.0 mg/L or below or the like (in FIG. 4, Step ST4).

Hereby, according to the finding by the present inventors, when the nitrate concentration in the reaction tank 2 exceeds 5.0 mg/L, nitrification rapidly proceeds and an inner state of the reaction tank 2 can be hardly controlled even if the amount of air is decreased. Therefore, it is desirable that the set target range is equal to or lower than 5.0 mg/L. In addition, when the supplied measurement value of the nitrate concentration is within the set target range (in FIG. 4, YES at Step ST4), the control unit 9 continues monitoring of the nitrate concentration by the nitrate meter 7 (in FIG. 4, Step ST3). It should be noted that, an appropriate set target range is set for each reaction tank according to the design such as the shape and size of the reaction tank 2.

Meanwhile, when the control unit 9 determines that the measurement value of the nitrate concentration supplied from the nitrate meter 7 is below the set target range, that is, below a lower limit of the set target range (in FIG. 4, NO at Step ST4), the control unit 9 executes control to increase the gas supply amount at least from the air diffuser units 6a and 6b so that the nitrate concentration at least in the aerobic tanks 2a and 2b is increased, by supplying a control signal to the gas supply-amount control units 10a to 10d (in FIG. 4, Step ST5). At this time, the control unit 9 may execute control to cause the gas supply amount by the air diffuser units 6c and 6d to be increased in the aerobic tanks 2c and 2d similarly to the air diffuser units 6a and 6b, or to cause the gas supply amount not to be changed.

On the other hand, when the value of the nitrate concentration supplied from the nitrate meter 7 exceeds the set target range, that is, even when the value exceeds an upper limit of the set target range, the control unit 9 determines that the measurement value of the nitrate concentration is outside the set target range (in FIG. 4, NO at Step ST4), and executes control to decrease the gas supply amount at least from the air diffuser units 6a and 6b so that the nitrate concentration at least in the aerobic tanks 2a and 2b is decreased by supplying a control signal to the gas supply-amount control units 10a to 10d (in FIG. 4, Step ST5). At this time, the control unit 9 may execute control to cause the gas supply amount by the air diffuser units 6c and 6d to be decreased in the aerobic tanks 2c and 2d similarly to the air diffuser units 6a and 6b, or to cause the gas supply amount not to be changed.

That is, in the above-described control of the air diffuser units 6a to 6d, the gas supply amount from the air diffuser units 6a to 6d can be uniformly increased or decreased, or the gas supply amount from the air diffuser units 6c and 6d can be maintained constant while increasing or decreasing the gas supply amount from the air diffuser units 6a and 6b. It should be noted that, the air diffuser units 6, for which increase/decrease control needs to be executed, is selected according to an installation position of the nitrate meter 7. Specifically, in case where the nitrate meter 7 is installed on a downstream side of the aerobic tank 2a or on an upstream side of the aerobic tank 2b, the control unit 9 controls the gas supply amount from the air diffuser unit 6a at least by the gas supply-amount control unit 10a. In contrast, in case where the nitrate meter 7 is installed on a downstream side of the aerobic tank 2c or on an upstream side of the aerobic tank 2d, the control unit 9 controls the respective gas supply amounts from the air diffuser units 6a to 6c at least by the gas supply-amount control units 10a to 10c. In control of the gas supply amount, the control unit 9 can execute control of the air diffuser units 6a to 6d for each of the gas supply-amount control units 10a to 10d independently of each other, can execute the same control with respect to the air diffuser units 6a to 6d, or can appropriately select a plurality of air diffuser units to be grouped in the air diffuser units 6a, 6b, 6c, and 6d to execute control for each group independently.

In this manner, because the control unit 9 supplies a control signal to the respective gas supply-amount control units 10a to 10d to control the gas supply amount from the respective air diffuser units 6a to 6d, the denitrification reaction and the nitrification reaction can be present together in the aerobic tanks 2a and 2b appropriately, and generation of the denitrification reaction in the reaction tank 2 can be controlled. In addition, because the control unit 9 controls the gas supply amount optimally, the gas supply amount from the air diffuser units 6a to 6d can be controlled to a necessary and sufficient amount, and power consumption of the blower 8 can be reduced to reduce power consumption in the wastewater treatment.

According to the above-described first embodiment of the present invention, in the aerobic tanks 2a to 2d constituting the reaction tank 2, the nitrate meter 7 is installed at the desired position along the flow direction of the water to be treated in the reaction tank 2, for example, on the inflow side of the aerobic tank 2c, which is at the intermediate position of the reaction tank 2, and the gas supply amount in the aerobic tanks 2a to 2d is controlled by at least the air diffuser units 6a and 6b, and by the air diffuser units 6a to 6d as required, based on the measurement of the nitrate concentration by the nitrate meter 7, so that the nitrate concentration falls within a predetermined range. Accordingly, the denitrification reaction mainly performed in the aerobic tanks 2a and 2b, which are relatively on the first half side of the reaction tank 2, can be controlled together with the nitrification reaction, and the nitrogen removal rate can be improved, thereby enabling to supply an appropriate amount of oxygen to the reaction tank 2 according to the organic loading and the nitrogen loading in the water to be treated. Furthermore, in case where there is another reaction tank having the same shape as that of the reaction tank 2, and there is inflow of wastewater or return of returned sludge under the same condition, the gas supply amount in the other reaction tank can be also controlled under the same condition as that in the reaction tank 2, thereby enabling to supply the appropriate amount of oxygen.

Figure 2B:
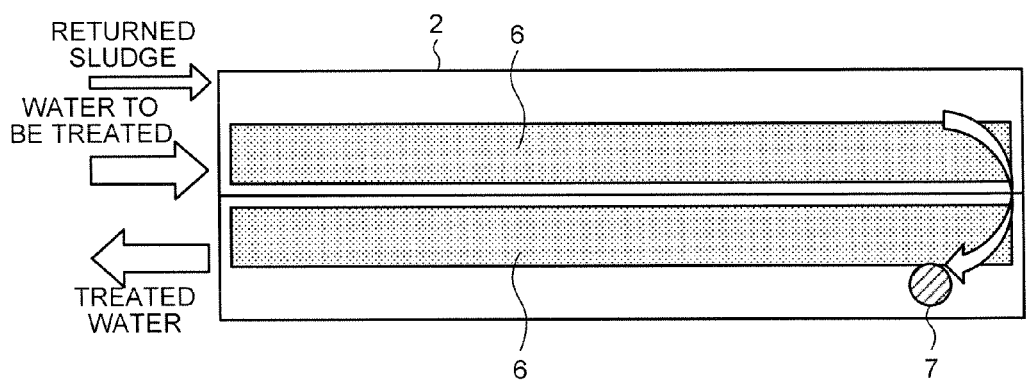
FIG. 2B is a plan view showing another modification of the reaction tank in the wastewater treatment apparatus according to the first embodiment of the present invention.

In addition, in the first embodiment, the reaction tank 2 is constituted by the four aerobic tanks 2a to 2d. However, the reaction tank 2 can be a single tank in which flow of the water to be treated occurs. FIG. 2B is a plan view in case where the reaction tank 2 is a single tank as a first modification of the first embodiment. As shown in FIG. 2B, the air diffusing unit may be constituted by the air diffuser unit 6 of a single body instead of the air diffuser units 6a to 6d. Even in this case, the nitrate meter 7 is provided at the desired position on the most downstream side of the area where it is required to control the denitrification reaction along the flow direction of the water to be treated. However, herein the nitrate meter 7 is installed substantially at the intermediate position along the flow direction of the water to be treated in the reaction tank 2. It should be noted that, even in case where the air diffusing unit is formed of the single air diffuser unit 6, the gas supply amount can be controlled for each gas supply portion in the reaction tank 2 in the air diffuser unit 6. In addition, even in case where the reaction tank 2 is a single tank, the air diffusing unit can be formed of a plurality of air diffuser units similarly to the above-described first embodiment. Furthermore, even in case where the reaction tank 2 is a single tank and the air diffusing unit is formed of a plurality of air diffuser units, the air diffuser units can be controlled independently of each other or can be controlled uniformly.

A wastewater treatment apparatus including a control device according to a second embodiment of the present invention is explained next. FIG. 5 is a configuration diagram showing the wastewater treatment apparatus according to the second embodiment.

As shown in FIG. 5, in the wastewater treatment apparatus according to the second embodiment, the reaction tank 2 is formed of a nitrification-denitrification reaction tank, which is not a plurality of stages of aerobic tanks, but is a single aerobic tank, differently from the first embodiment. In addition, the nitrate meter 7 is installed at a desired position in a flow direction of the water to be treated in the reaction tank 2, that is, at a predetermined position for controlling the denitrification reaction in the water to be treated on the more upstream side. The nitrate meter 7 measures the nitrate concentration at the predetermined position and supplies a measurement result to the control unit 9. The control unit 9 controls the gas supply amount (an aeration amount) from the air diffuser units 6a and 6b at least on the upstream side of the nitrate meter 7, based on the supplied nitrate concentration. It should be noted that, the control unit 9 can control the air diffuser units 6a to 6d so that the gas supply amounts thereof become uniform throughout the reaction tank 2, or can control the air diffuser units 6a and 6b, and the air diffuser units 6c and 6d individually.

In addition, an anaerobic tank 12 is provided in a front stage of the reaction tank 2 along the flow direction of the water to be treated. The anaerobic tank 12 is a tank into which the water to be treated, which is nitrogen-containing water, flows via the primary sedimentation tank 1. An agitating unit 12b that can be rotated by an external motor 12a is provided in the anaerobic tank 12, and the activated sludge in the anaerobic tank 12 is agitated by the agitating unit 12b. It should be noted that, in some cases, the primary sedimentation tank 1 may not be provided according to the configuration of the sewage treatment plant, and in this case, raw water flows into the anaerobic tank 12 first. The anaerobic tank 12 is for performing dephosphorization treatment (anaerobic treatment) with respect to the water to be treated by an action of phosphorus-accumulating bacteria under an anaerobic environment. In addition, in the anaerobic tank 12, organic matter contained in the water to be treated is taken into the activated sludge under the anaerobic condition, and phosphorus contained in the activated sludge is discharged into raw water.

In addition, the activated sludge 4b deposited at the bottom of the solid-liquid separation tank 3 is returned to the anaerobic tank 12 by the sludge returning path 5 connected to the bottom of the solid-liquid separation tank 3. Accordingly, biomass in the anaerobic tank 12 and the reaction tank 2 on the downstream side thereof can be maintained at a predetermined amount. It should be noted that, the rest of the activated sludge 4b generated in the solid-liquid separation tank 3 is discharged to outside as surplus sludge. Other configurations of the second embodiment are identical to those of the first embodiment, and thus explanations thereof will be omitted.

In the second embodiment, the nitrate meter 7 that supplies the measured nitrate concentration to the control unit 9 is installed at the desired position in the single reaction tank 2, thereby enabling to achieve effects identical to those of the first embodiment.

Figure 7A:
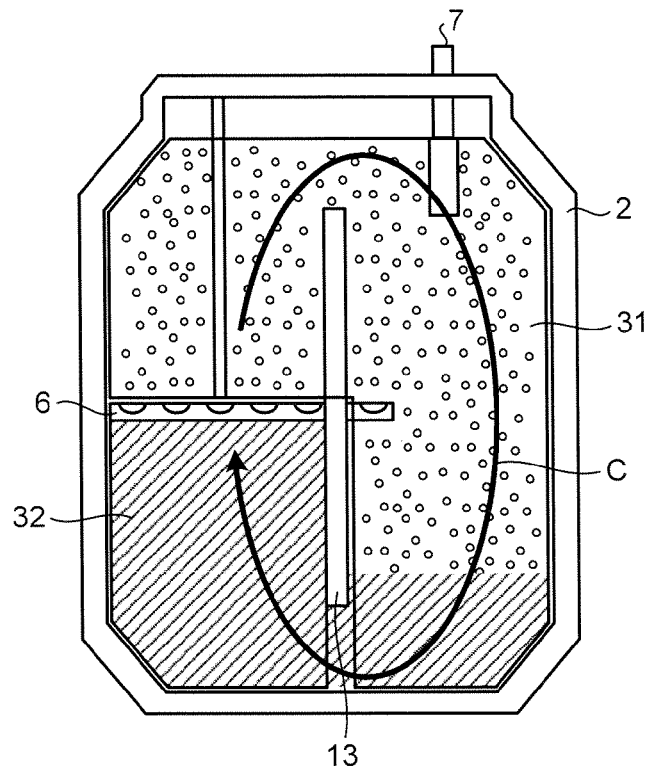
FIG. 7A is a sectional view of the reaction tank along a line A-A shown in FIG. 6.
Figure 7B:
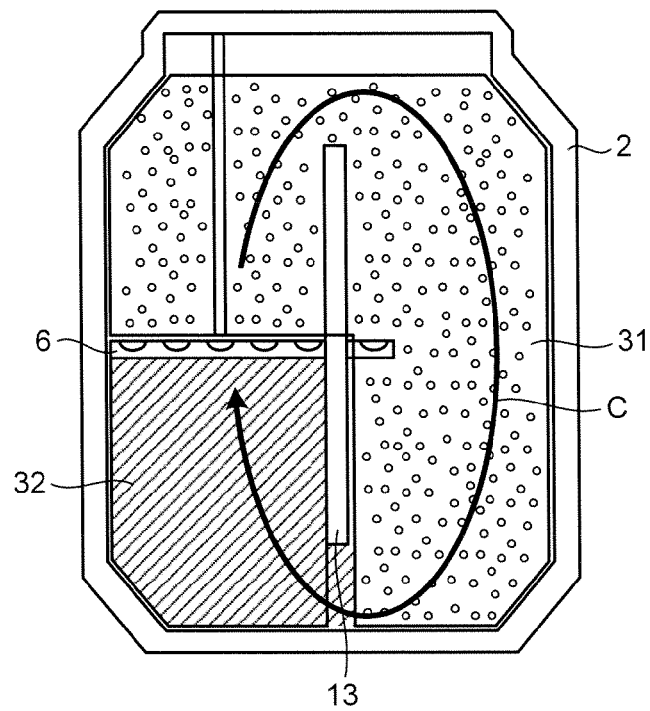
FIG. 7B is a sectional view of the reaction tank along a line B-B shown in FIG. 6.

A wastewater treatment apparatus including a control device according to a third embodiment of the present invention is explained next. FIG. 6 is a perspective transparent view showing the anaerobic tank 12 and the reaction tank 2 in the wastewater treatment apparatus according to the third embodiment. In FIG. 6, the side walls of the anaerobic tank 12 and the reaction tank 2 on a side closer to a viewer in FIG. 6 are not shown for the sake of explanations below. FIGS. 7A and 7B are respectively a sectional view of the reaction tank along a line A-A shown in FIG. 6 and a sectional view of the reaction tank along a line B-B shown in FIG. 6.

As shown in FIG. 6, the reaction tank 2 is formed of a single tank, and the anaerobic tank 12 is provided on the front stage of the reaction tank 2 along the flow direction of the water to be treated. Raw water flows into the anaerobic tank 12 from one side thereof, and the water to be treated that is anaerobically treated in the anaerobic tank 12 is supplied to the reaction tank 2 from the other side of the anaerobic tank 12.

In addition, a plate-like air diffuser unit 6 is provided in the reaction tank 2 substantially at the midpoint of the reaction tank 2 along a height direction thereof. The air diffuser unit 6 is configured to be capable of adjusting the gas supply amount by the gas supply-amount control unit 10 for each predetermined section along the flow direction of the water to be treated, which is a longitudinal direction of the reaction tank 2.

In addition, the nitrate meter 7 that can measure the nitrate concentration is installed at a predetermined position in the flow direction of the water to be treated in the reaction tank 2, that is, along the longitudinal direction of the reaction tank 2. The nitrate meter 7 supplies the measured nitrate concentration to the control unit 9. The control unit 9 supplies a control signal to the gas supply-amount control unit 10 according to a predetermined program based on the measurement value of the supplied nitrate concentration. The gas supply-amount control unit 10 controls the gas supply amount so as to be uniform throughout the entire air diffuser unit 6 or control the gas supply amount for each predetermined section of the air diffuser unit 6 based on the supplied control signal.

In addition, a partition plate 13 is provided at the central part of the reaction tank 2 along the longitudinal direction thereof. The partition plate 13 is installed so that a thickness direction thereof is substantially parallel to the bottom surface of the reaction tank 2. In other words, the partition plate 13 is installed so that the surface thereof becomes vertical to the bottom surface of the reaction tank 2. Portions above and below the partition plate 13 are opened so that the inside of the reaction tank 2 is in a partially-separated state by the partition plate 13.

In the reaction tank 2 configured in this manner, when gas is supplied to the water to be treated from the air diffuser unit 6 to perform aeration while the water to be treated is flowing into the reaction tank 2, the aerated gas rises along the partition plate 13, and is swirled to the opposite surface side in a state of being separated by the partition plate 13. Along with this swirling, because the water to be treated flows along the longitudinal direction of the reaction tank 2, the aerated gas dissolves in the water to be treated while forming a spiral swirling flow as shown by an arrow C in FIG. 6. Similarly, the water to be treated also travels along the longitudinal direction of the reaction tank 2, while spirally swirling substantially around a longitudinal axis of the reaction tank 2. It should be noted that, the gas supply amount from the air diffuser unit 6 is appropriately set according to conditions such as an inflow amount of the water to be treated, and the size and shape or the like of the reaction tank 2.

In addition, as shown by an arrow C in FIG. 7A, which is a sectional view along the line A-A at a position where the nitrate meter 7 is provided, gas containing oxygen such as air diffused from the air diffuser unit 6 passes through a gap above the partition plate 13 together with the water to be treated and is swirled to the opposite side. The water to be treated accompanying swirl of air passes through a gap below the partition plate 13 and reaches a lower part of the air diffuser unit 6. In this case, an aerobic area 31 on the upstream side and an anoxic anaerobic area 32 on the downstream side are present together along the flow direction (the arrow C) of the swirling flow of the water to be treated. While the aerobic area 31 constitutes a nitrification area in which the nitrification reaction is promoted by aerobic nitrification bacteria, the anoxic anaerobic area 32 constitutes a denitrification area in which the denitrification reaction is promoted by anaerobic denitrification bacteria.

In addition, as shown in FIG. 7A, oxygen based on the gas supply amount from the air diffuser unit 6 on an upstream side of the position shown in FIG. 7A dissolves in the water to be treated on the upstream side along the longitudinal direction of the reaction tank 2. In contrast to this, at the position shown in FIG. 7B, because the position is on the more downstream side along the longitudinal direction of the reaction tank 2, an amount of dissolved oxygen increases as compared to the position shown in FIG. 7A. Therefore, the anoxic anaerobic area 32 shown in FIG. 7B is reduced in size as compared to the anoxic anaerobic area 32 shown in FIG. 7A. That is, because the water to be treated flows along the longitudinal direction of the reaction tank 2 from the upstream side toward the downstream side, a contact amount with oxygen increases as advancing toward the downstream side, and dissolved oxygen increases to expand the aerobic area 31. Accordingly, in the water to be treated in the reaction tank 2, the denitrification area tends to decrease as shifting from the upstream side toward the downstream side. On the other hand, the nitrification area tends to increase as shifting from the upstream side toward the downstream side.

As described above, on the upstream side of the reaction tank 2, the denitrification reaction is promoted while the nitrification reaction is present together, and the nitrification reaction is promoted while the denitrification reaction is occurring on the downstream side. Accordingly, as shown in FIG. 3, because the denitrification reaction immediately proceeds even when the nitrification reaction is performed on the upstream side of the reaction tank 2, nitrate-nitrogen ($NO_3$—N) or nitrite-nitrogen ($NO_2$—N) are hardly yielded. In addition, the nitrate concentration increases by promoting the nitrification reaction as advancing toward the downstream side of the reaction tank 2, although the total nitrate concentration decreases due to the denitrification reaction. It should be noted that, other configurations of the third embodiment are identical to those of the first and second embodiments, and thus explanations thereof will be omitted.

According to the third embodiment described above, because the partition plate 13 is provided to generate the swirling flow of the water to be treated by the supply of gas from the air diffuser unit 6 in the reaction tank 2, the nitrification reaction and the denitrification reaction can be performed together under favorable control, the yield of nitrate by the nitrification reaction can be efficiently controlled on the upstream side, and the nitrification reaction can be promoted on the downstream side. Accordingly, by controlling the air diffuser unit 6 so that the nitrate concentration falls within a set range, while measuring the nitrate concentration by the nitrate meter 7, the denitrification reaction and the nitrification reaction in the reaction tank 2 can be controlled more accurately.

Modifications of the reaction tank 2 and the air diffuser unit 6 therein according to the respective embodiments of the present invention are explained next.

Figure 8A:
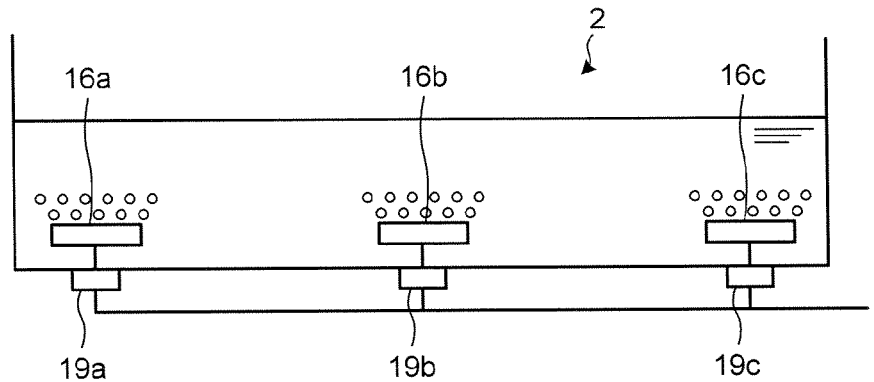
FIG. 8A is a configuration diagram showing a reaction tank according to another modification of the embodiments of the present invention.

FIG. 8A is a configuration diagram showing the reaction tank 2 according to a second modification. As shown in FIG. 8A, in the reaction tank 2 according to the second modification, similarly to the second embodiment, a plurality of air diffuser units 16a, 16b, and 16c are provided in the reaction tank 2. These air diffuser units 16a to 16c are respectively controlled by gas supply-amount control units 19a, 19b, and 19c that control the gas supply amount based on a control signal from the control unit 9 (in FIG. 8A, not shown). Furthermore, differently from the second embodiment, the air diffuser units 16a to 16c are provided with a predetermined interval therebetween. That is, while gas is supplied to the reaction tank 2 as a whole, an area to which gas is supplied and an area to which gas is not supplied are formed sequentially, alternately, or repeatedly, locally along the flow direction of the water to be treated. Accordingly, while the aerobic nitrification bacteria and the facultative anaerobic denitrification bacteria are present together in the reaction tank 2, activities of these bacteria can be alternately activated. Therefore, similarly to the reaction tank 2 explained in the third embodiment, the area in which the nitrification reaction occurs and the area in which the denitrification reaction occurs can be formed in the reaction tank 2 under favorable control.

Figure 8B:
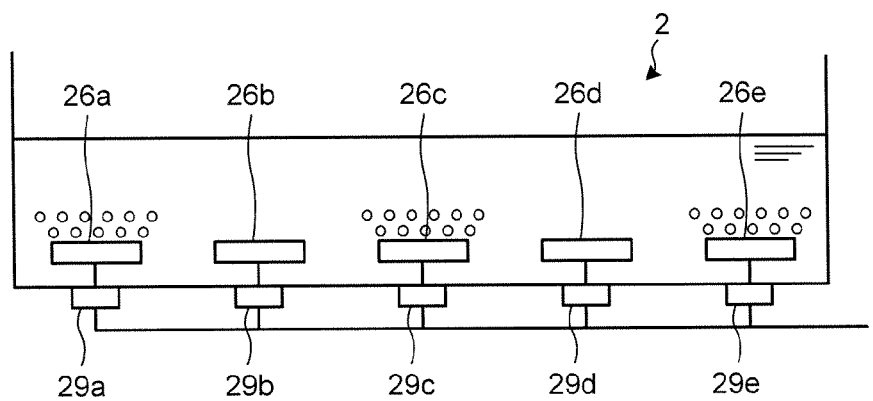
FIG. 8B is a configuration diagram showing a reaction tank according to another modification of the embodiments of the present invention.

FIG. 8B is a configuration diagram of the reaction tank 2 according to a third modification. As shown in FIG. 8B, in the reaction tank 2 according to the third modification, similarly to the second embodiment, a plurality of air diffuser units 26a, 26b, 26c, 26d, and 26e are provided in the reaction tank 2. In addition, these air diffuser units 26a to 26e are controlled respectively by gas supply-amount control units 29a, 29b, 29c, 29d, and 29e that control gas supply amount based on a control signal from the control unit 9 (in FIG. 8B, not shown). In addition, differently from the second embodiment, the control unit 9 selectively sets the air diffuser units that perform aeration and the air diffuser units that do not perform aeration with respect to the air diffuser units 26a to 26e. It should be noted that, in FIG. 8B, it is controlled such that the air diffuser units 26a, 26c, and 26e perform aeration, and the air diffuser units 26b and 26d do not perform aeration. In addition, the air diffuser units, among the air diffuser unit 26a to 26e, that perform aeration and the air diffuser units that do not perform aeration are appropriately selected according to the water quality property of the water to be treated flowing in the reaction tank 2. That is, while gas is supplied to the reaction tank 2 as a whole, an area to which gas is supplied and an area to which gas is not supplied are formed sequentially, alternately, or repeatedly, locally along a flow direction of the water to be treated. Accordingly, while the aerobic nitrification bacteria and the facultative anaerobic denitrification bacteria are present together in the reaction tank 2, activities of these bacteria can be activated sequentially, alternately, or repeatedly. Therefore, similarly to the reaction tank 2 explained in the third embodiment, the area in which the nitrification reaction occurs and the area in which the denitrification reaction occurs can be formed in the reaction tank 2 under favorable control.

Figure 8C:
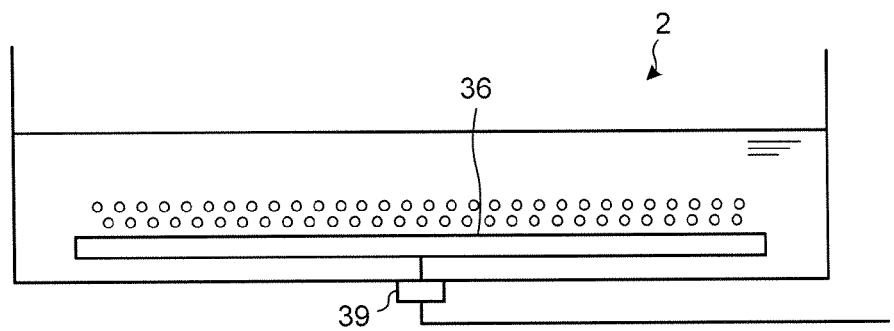
FIG. 8C is a configuration diagram showing a reaction tank according to another modification of the embodiments of the present invention.

In addition, FIG. 8C is a configuration diagram showing the reaction tank 2 according to a fourth modification. As shown in FIG. 8C, in the reaction tank 2 according to the fourth modification, similarly to the first modification of the first embodiment, a single air diffuser unit 36 is provided in the reaction tank 2. In addition, the air diffuser unit 36 is controlled by a gas supply-amount control unit 39 that controls the gas supply amount based on a control signal from the control unit 9 (in FIG. 8C, not shown). In addition, differently from the third modification, the control unit 9 controls the air diffuser unit 36 to perform aeration sequentially, alternately, or repeatedly or not to perform aeration with the passage of time.

Figure 8D:
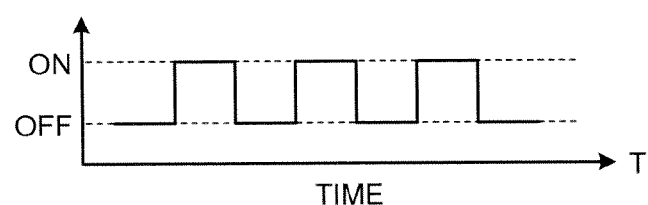
FIG. 8D is a timing chart showing a timing of aeration with the passage of time of an air diffuser unit in the reaction tank shown in FIG. 8C.

FIG. 8D is an example of a timing chart of a timing of the presence of aeration. As shown in FIG. 8D, a time for performing aeration by the air diffuser unit 36 (ON in FIG. 8D) and a time for not performing aeration (OFF in FIG. 8D) are appropriately set according to various conditions such as the water quality property of the water to be treated flowing in the reaction tank 2. That is, while gas is supplied to the reaction tank 2 as a whole, a time during which gas is supplied to the water to be treated and a time during which gas is not supplied are set sequentially, alternately, or repeatedly, with the passage of time. Accordingly, while the aerobic nitrification bacteria and the facultative anaerobic denitrification bacteria are present together in the reaction tank 2, activities of these bacteria can be activated sequentially, alternately, or repeatedly with the passage of time. Therefore, similarly to the reaction tank 2 explained in the third embodiment, the area in which the nitrification reaction occurs and the area in which the denitrification reaction occurs can be formed in the reaction tank 2 under favorable control.

Figure 8E:
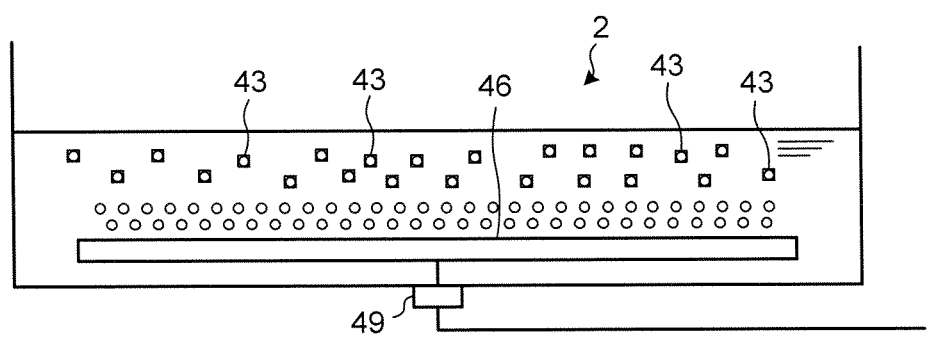
FIG. 8E is a configuration diagram showing a reaction tank according to another modification of the embodiments of the present invention.
Figure 8F:
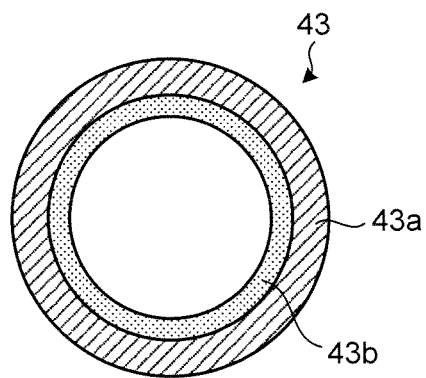
FIG. 8F is a sectional schematic diagram showing a carrier that carries microorganisms floated in the reaction tank shown in FIG. 8E.

Furthermore, FIG. 8E is a configuration diagram showing the reaction tank 2 according to a fifth modification. As shown in FIG. 8E, in the reaction tank 2 according to the fifth modification, a single air diffuser unit 46 is provided in the reaction tank 2 similarly to the fourth modification. In addition, the air diffuser unit 46 is controlled by a gas supply-amount control unit 49 that controls the gas supply amount based on a control signal from the control unit 9 (in FIG. 8E, not shown). In addition, a plurality of carriers 43 that carry both the aerobic nitrification bacteria and the facultative anaerobic denitrification bacteria are loaded into the reaction tank 2. In addition, when gas is supplied from the air diffuser unit 46 into the reaction tank 2, the inside of the reaction tank 2 is agitated, and the carriers 43 flow in the water to be treated and is distributed substantially uniformly in the water to be treated. FIG. 8F is a sectional view of a sectional structure of the carrier 43.

As shown in FIG. 8F, the carrier 43 is formed of a granular resin carrier, and various sizes and shapes can be adopted, so long as the carrier 43 can hold bacteria in the water to be treated even in a flowing state. For example, it is desirable that an external diameter of a columnar or spherical shape is about several millimeters. In addition, the aerobic nitrification bacteria are mainly carried in a nitrification reaction zone, and the facultative anaerobic denitrification bacteria are mainly carried in a denitrification reaction zone on a surface portion of the carrier 43. Specifically, the carriers 43 carry, on the surface portion thereof, two-layered microbial biofilms that cause the aerobic nitrification bacteria contributing to the nitrification reaction to be present in an outer area 43a and the facultative anaerobic denitrification bacteria contributing to the anaerobic denitrification reaction to be present in an inner area 43b as dominant species in a form of being surrounded by the nitrification bacteria. Accordingly, in the carriers 43 in the water to be treated, as the dominant species, aerobic conditions are secured for the nitrification bacteria positioned on the outer side, and anaerobic conditions are secured for the denitrification bacteria positioned on the inner side in the form of being surrounded by the nitrification bacteria.

That is, while gas is supplied to the reaction tank 2 as a whole, the aerobic nitrification bacteria and the anaerobic denitrification bacteria are present together by the carrier 43 itself in the water to be treated in the reaction tank 2, thereby enabling to form a state where the nitrification reaction and the denitrification reaction are present together. Accordingly, while the aerobic nitrification bacteria and the facultative anaerobic denitrification bacteria are present together in the reaction tank 2, activities of these bacteria can be activated. Therefore, the nitrification reaction and the denitrification reaction can be present together in the reaction tank 2 under favorable control.

A modification of an instrument to be used as the denitrification confirming unit in the respective embodiments of the present invention described above is explained next.

Figure 9A:
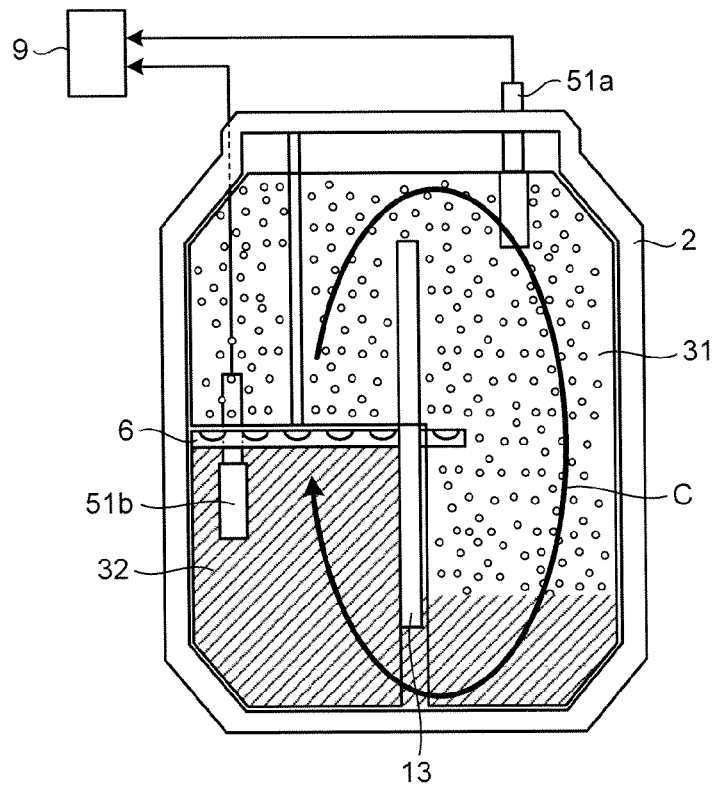
FIG. 9A is a sectional view at an installation position in case where a pair of DO analyzers are installed in the reaction tank shown in FIG. 6.
Figure 9B:
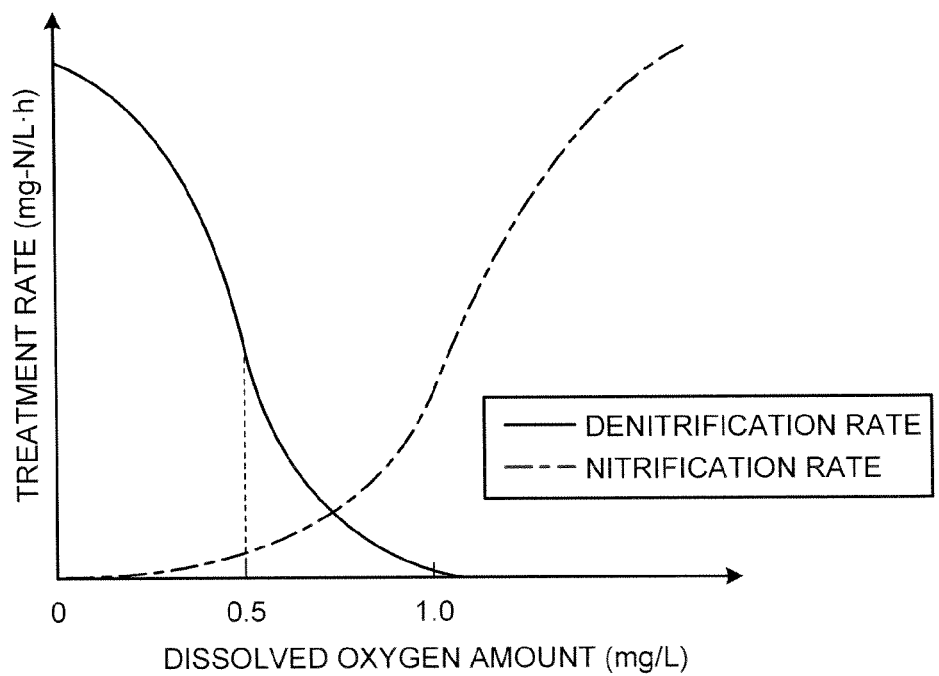
FIG. 9B is a graph representing dependencies of a denitrification rate and a nitrification rate on a dissolved oxygen concentration.

A sixth modification is explained first. FIG. 9A is a sectional view of the reaction tank 2 according to the sixth modification corresponding to FIG. 7A, which shows the reaction tank 2 according to the third embodiment. In addition, FIG. 9B is a graph representing dependencies, on a dissolved oxygen concentration, of a denitrification rate and a nitrification rate. In the sixth modification, a pair of dissolved oxygen (DO) analyzers is used as the denitrification confirming unit.

That is, as shown in FIG. 9A, the aerobic area 31 and the anoxic anaerobic area 32 are respectively formed sequentially on the upstream side and the downstream side along the swirling flow of the water to be treated inside the reaction tank 2 in which swirling flow is generated. In addition, in the sixth embodiment, differently from the third embodiment, a first DO analyzer 51a and a second DO analyzer 51b that measure the dissolved oxygen concentration (a DO concentration) are installed in a pair, respectively in the aerobic area 31 and the anoxic anaerobic area 32, whose formation is ascertained beforehand. It should be noted that, because the swirling flow in the reaction tank 2 is generally spiral, the first DO analyzer 51a and the second DO analyzer 51b are preferably installed at positions slightly shifted along the longitudinal direction of the reaction tank 2. However, in FIG. 9A, the first DO analyzer 51a and the second DO analyzer 51b are described at the same position along the longitudinal direction of the reaction tank 2, for convenience sake. Furthermore, measurement values of the DO concentration measured by the first DO analyzer 51a and the second DO analyzer 51b are respectively supplied to the control unit 9. Other configurations of the present modification are identical to those of the third embodiment, and thus explanations thereof will be omitted.

A control method performed by the control unit 9 when the DO analyzer is used as the denitrification confirming unit is explained next. First, the second DO analyzer 51b measures a DO concentration DO2 in the anoxic anaerobic area 32. The second DO analyzer 51b supplies the DO concentration DO2 to the control unit 9. Subsequently or simultaneously therewith, the first DO analyzer 51a measures a DO concentration DO1 in the aerobic area 31. The first DO analyzer 51a supplies the DO concentration DO1 to the control unit 9.

The control unit 9 determines whether the DO concentration DO2 in the anoxic anaerobic area 32 is within a predetermined DO concentration range, specifically according to the findings obtained from experiments by the present inventors, for example, higher than 0 mg/L and equal to or lower than 0.5 mg/L (0 mg/L<DO2≤0.5 mg/L). Herein, as shown in FIG. 9B, in case where the DO concentration is equal to or lower than 0.5 mg/L, dependency of the denitrification rate on the DO concentration is a graph of convex upward, and as the DO concentration decreases, the treatment rate increases. Furthermore, when the DO concentration is equal to or lower than 0.5 mg/L, the dependency of the nitrification rate on the DO concentration is considerably small. Therefore, if the DO concentration DO2 of the water to be treated in the anoxic anaerobic area 32 measured by the second DO analyzer 51b is equal to or lower than 0.5 mg/L, it can be confirmed that the denitrification treatment is being efficiently performed, while the nitrification treatment is being suppressed, on an upstream side of the second DO analyzer 51b along the longitudinal direction of the reaction tank 2.

In addition, when the DO concentration DO2 in the anoxic anaerobic area 32 shown in FIG. 9A is outside the predetermined DO concentration range, the control unit 9 controls the gas supply amount from the air diffuser unit 6, thereby controlling the DO concentration in the anoxic anaerobic area 32 to be within the predetermined DO concentration range. Specifically, in case where the DO concentration DO2 exceeds an upper limit of the predetermined DO concentration range (for example, 0.5 mg/L), the control unit 9 decreases the gas supply amount at least on the upstream side of the second DO analyzer 51b along a flow direction of the water to be treated. On the other hand, in case where the DO concentration DO2 falls below a lower limit of the predetermined DO concentration range, the control unit 9 increases the gas supply amount at least on the upstream side of the second DO analyzer 51b along the flow direction of the water to be treated.

Furthermore, the control unit 9 determines whether the DO concentration DO1 in the aerobic area 31 is equal to or higher than the DO concentration DO2 in the anoxic anaerobic area 32 by a predetermined DO concentration, specifically for example, by 0.5 mg/L (DO2+0.5 mg/L≤DO1). As herein shown in FIG. 9B, as the available range of DO2+0.5 mg/L, in case where the DO concentration is higher than 0.5 mg/L, the dependency of the nitrification rate on the DO concentration is increasing monotonously, and as the DO concentration increases, the treatment rate increases. Therefore, if the DO concentration DO1 of the water to be treated in the aerobic area 31 measured by the first DO analyzer 51*a* is higher than the DO concentration DO2 of the water to be treated in the anoxic anaerobic area 32 by 0.5 mg/L or more, it can be confirmed that the nitrification treatment is promoted while the denitrification treatment is being performed on a downstream side of the first DO analyzer 51*a* along the longitudinal direction of the reaction tank 2.

In addition, in case where the DO concentration DO1 in the aerobic area 31 shown in FIG. 9A falls below the DO concentration obtained by adding a predetermined DO concentration (for example, 0.5 mg/L) to the DO concentration DO2 in the anoxic anaerobic area 32, the control unit 9 controls so that the DO concentration DO1 in the aerobic area 31 becomes a DO concentration higher than the DO concentration DO2 by the predetermined DO concentration by controlling the gas supply amount from the air diffuser unit 6. Specifically, when the DO concentration DO1 falls below the DO concentration obtained by adding the predetermined DO concentration (for example, 0.5 mg/L) to the DO concentration DO2, the control unit 9 increases the gas supply amount at least on an upstream side of the first DO analyzer 51*a* along a flow direction of the water to be treated.

In the sixth modification described above, the control of the denitrification treatment executed by the nitrate meter in the embodiments described above is performed by using the pair of DO analyzers. Accordingly, while the aerobic nitrification bacteria and the facultative anaerobic denitrification bacteria are present together in the reaction tank 2, activities of these bacteria can be activated. Therefore, the nitrification reaction and the denitrification reaction can be performed together under favorable control.

Figure 10A:
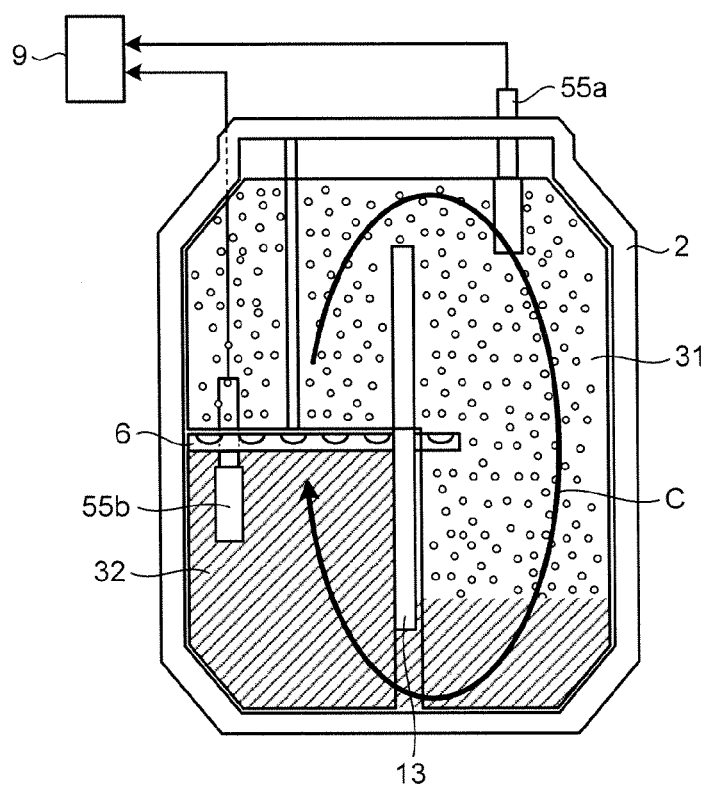
FIG. 10A is a sectional view at an installation position in case where a pair of ORP meters are installed in the reaction tank shown in FIG. 6.
Figure 10B:
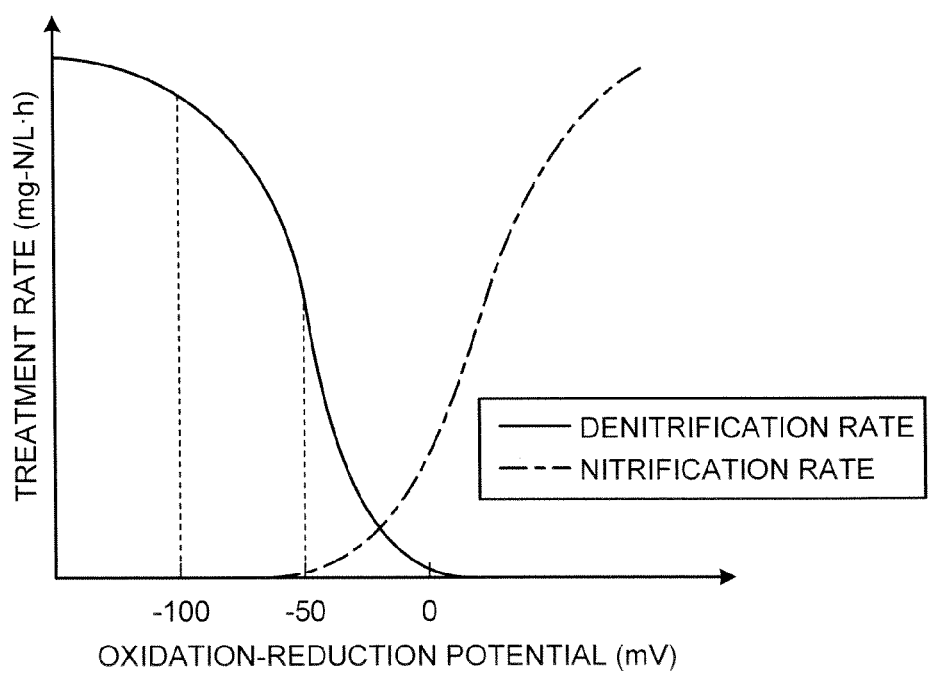
FIG. 10B is a graph representing dependencies of a denitrification rate and a nitrification rate on a dissolved oxygen concentration.

A seventh modification is explained next. FIG. 10A is a sectional view of the reaction tank 2 according to the seventh modification corresponding to FIG. 7A, which shows the reaction tank 2 according to the third embodiment. In addition, FIG. 10B is a graph representing dependencies of the denitrification rate and the nitrification rate on an oxidation reduction potential. In the seventh modification, a pair of oxidation-reduction potential meters (ORP meters) is used as the denitrification confirming unit.

That is, as shown in FIG. 10A, in the seventh modification, differently from the third embodiment, a first ORP meter 55*a* and a second ORP meter 55*b* that can measure the oxidation-reduction potential (an ORP value) are installed in a pair, respectively, in the aerobic area 31 and the anoxic anaerobic area 32, whose formation is ascertained beforehand inside the reaction tank 2 forming the swirling flow. It should be noted that, because the swirling flow in the reaction tank 2 is generally spiral, the first ORP meter 55*a* and the second ORP meter 55*b* are preferably installed at positions slightly shifted along the longitudinal direction of the reaction tank 2. However, in FIG. 10A, the first ORP meter 55*a* and the second ORP meter 55*b* are described at the same position along the longitudinal direction of the reaction tank 2, for convenience sake. Furthermore, measurement values of the ORP values measured by the first ORP meter 55*a* and the second ORP meter 55*b* are respectively supplied to the control unit 9. Other configurations of the present modification are identical to those of the third embodiment, and thus explanations thereof will be omitted.

A control method performed by the control unit 9 in case where the pair of ORP meters is used as the denitrification confirming unit is explained next. First, the second ORP meter 55*b* measures an ORP value ORP2 in the anoxic anaerobic area 32. The second ORP meter 55*b* supplies the ORP value ORP2 to the control unit 9. Subsequently or simultaneously therewith, the first ORP meter 55*a* measures an ORP value ORP1 in the aerobic area 31. The first ORP meter 55*a* supplies the ORP value ORP1 to the control unit 9.

The control unit 9 determines whether the ORP value ORP2 in the anoxic anaerobic area 32 is within a predetermined ORP value range, specifically according to the findings obtained from experiments by the present inventors, for example, equal to or lower than −50 mV (ORP2≤−50 mV). As herein shown in FIG. 10B, in case where the ORP value is equal to or lower than −50 mV, the dependency of the denitrification rate on the ORP value becomes a graph of convex upward, and as the ORP value decreases, the treatment rate increases. Furthermore, in case where the ORP value is equal to or lower than −50 mV, the nitrification rate substantially approaches 0. Therefore, if the ORP value of the water to be treated in the anoxic anaerobic area 32 measured by the second ORP meter 55*b* is equal to or lower than −50 mV, it can be confirmed that the denitrification treatment is being efficiently performed, while the nitrification treatment is being suppressed, on an upstream side of the second ORP meter 55*b* along the longitudinal direction of the reaction tank 2.

In addition, in case where the ORP value ORP2 in the anoxic anaerobic area 32 shown in FIG. 10A is outside the predetermined ORP value range, the control unit 9 controls the gas supply amount from the air diffuser unit 6, thereby controlling the ORP value in the anoxic anaerobic area 32 to be within the predetermined ORP value range. Specifically, in case where the ORP value ORP2 exceeds an upper limit of the predetermined ORP value range (for example, −50 mV), the control unit 9 decreases the gas supply amount at least on the upstream side of the second ORP meter 55*b* along a flow direction of the water to be treated. On the other hand, in case where the ORP value ORP2 falls below a lower limit of the predetermined ORP value range (for example, −100 mV), the control unit 9 increases the gas supply amount at least on the upstream side of the second ORP meter 51*b* along the flow direction of the water to be treated.

Furthermore, the control unit 9 determines whether the ORP value ORP1 in the aerobic area 31 is equal to or higher than the ORP value ORP2 in the anoxic anaerobic area 32 by a predetermined ORP value, specifically for example, by 50 mV (ORP2+50 mV ORP1). As herein shown in FIG. 10B, as the available range of ORP2+50 mV, in case where the ORP value is higher than −50 mV, the dependency of the nitrification rate on the ORP value increases monotonously, and as the ORP value increases, the treatment rate increases. Therefore, if the ORP value ORP1 of the water to be treated in the aerobic area 31 measured by the first ORP meter 55*a* is higher than the ORP value ORP2 of the water to be treated in the anoxic anaerobic area 32 by 50 mV or more, it can be confirmed that the nitrification treatment is promoted while the denitrification treatment is being performed on a downstream side of the first ORP meter 55*a* along the longitudinal direction of the reaction tank 2.

In addition, in case where the ORP value ORP1 in the aerobic area 31 shown in FIG. 10A falls below the ORP value obtained by adding a predetermined ORP value (for example, 50 mV) to the ORP value ORP2 in the anoxic anaerobic area 32, the control unit 9 controls the gas supply amount from the air diffuser unit 6, thereby controlling the ORP value ORP1 in the aerobic area 31 to be higher than the ORP value ORP2 by the predetermined ORP value. Specifically, when the ORP value ORP1 falls below the ORP value obtained by adding the predetermined ORP value (for example, 50 mV) to the ORP value ORP2, the control unit 9 increases the gas supply amount at least on an upstream side of the first ORP meter 55a along the flow direction of the water to be treated.

In the seventh modification described above, the control of the denitrification treatment executed by the nitrate meter in the embodiments described above is performed by using the pair of ORP meters. Accordingly, while the aerobic nitrification bacteria and the facultative anaerobic denitrification bacteria are present together in the reaction tank 2, activities of these bacteria can be activated. Therefore, the nitrification reaction and the denitrification reaction can be performed together under favorable control.

Figure 11A:
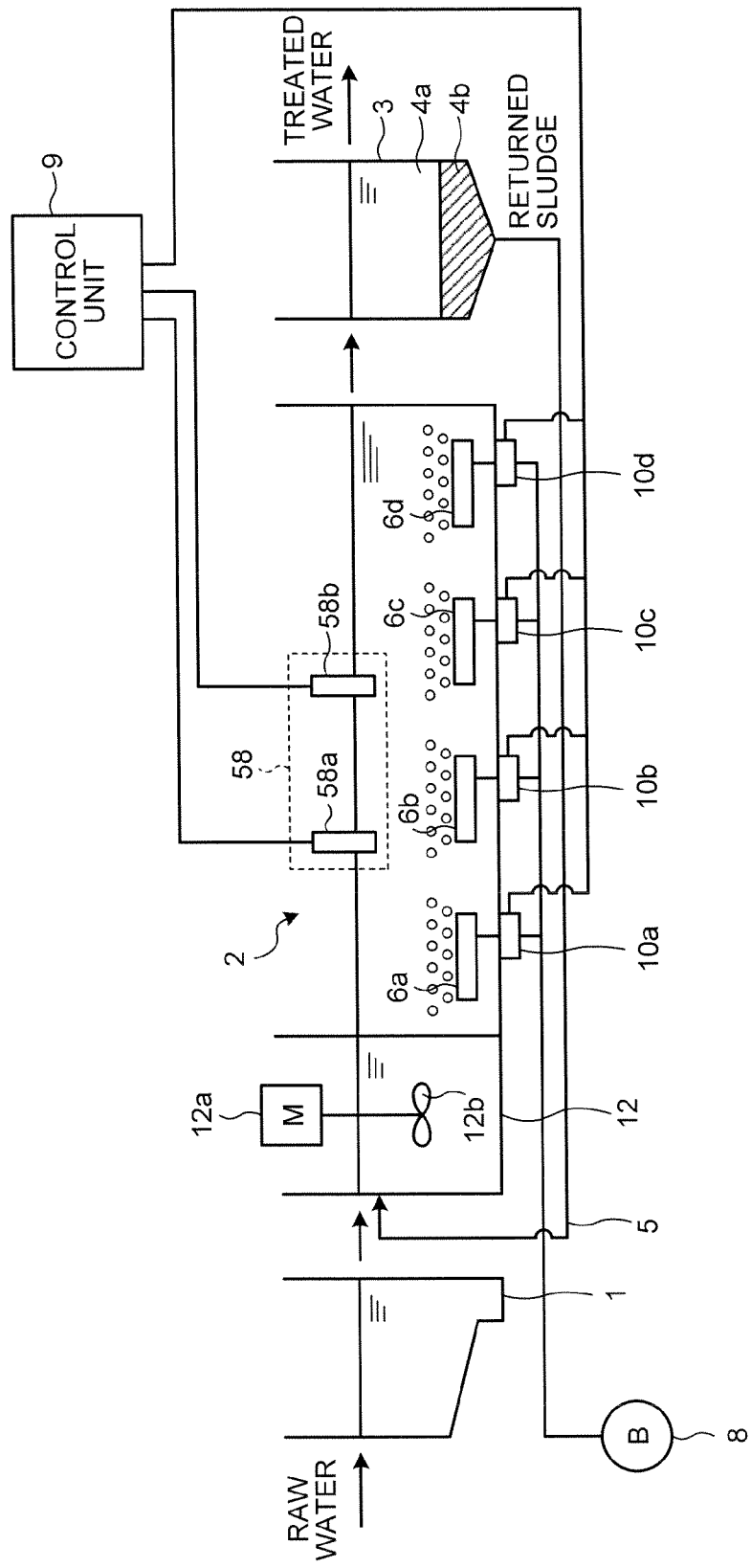
FIG. 11A is a configuration diagram showing a case where an ammonia meter is installed in the wastewater treatment apparatus shown in FIG. 5.
Figure 11B:
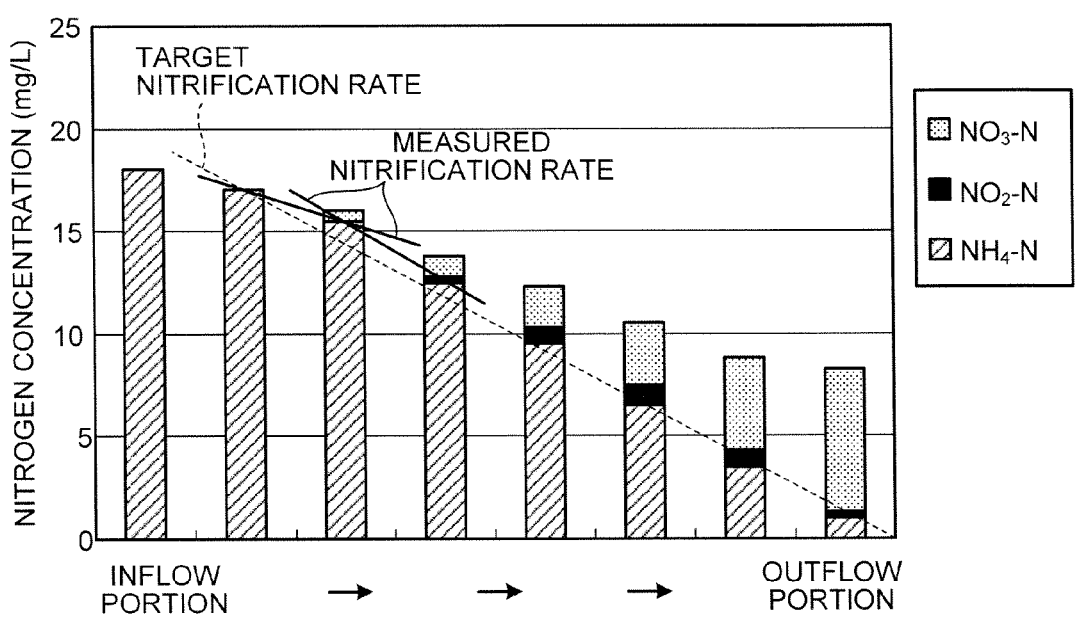
FIG. 11B is a graph showing a nitrogen concentration in $NH_4$—N, $NO_2$—N, and $NO_3$—N and a total nitrogen concentration thereof measured along a flow of water to be treated in the reaction tank, for explaining a target nitrification rate and a measured nitrification rate.

An eighth modification is explained next. FIG. 11A is a configuration diagram of a wastewater treatment apparatus according to the eighth modification corresponding to FIG. 5 according to the second embodiment. In addition, FIG. 11B is a graph showing a nitrogen concentration in $NH_4$—N, $NO_2$—N, and $NO_3$—N and a total nitrogen concentration thereof measured along a flow of the water to be treated in the reaction tank corresponding to FIG. 3, for explaining a target nitrification rate and a measured nitrification rate. In the eighth modification, a pair of ammonia meters is used as the denitrification confirming unit.

That is, as shown in FIG. 11A, in the eighth modification, differently from the second embodiment, a nitrification rate meter 58 formed of a pair of ammonia meters, that is, a first ammonia meter 58a on the upstream side along a flow direction of the water to be treated and a second ammonia meter 58b on the downstream side is installed, instead of the nitrate meter 7 in the reaction tank 2. Measurement values of the ammonia concentration measured by the first ammonia meter 58a and the second ammonia meter 58b are respectively supplied to the control unit 9. Other configurations of the present modification are identical to those of the second embodiment, and thus explanations thereof will be omitted.

A control method performed by the control unit 9 in case where the nitrification rate meter 58 formed of the pair of the first ammonia meter 58a and the second ammonia meter 58b is used as the denitrification confirming unit is explained next. First, the first ammonia meter 58a and the second ammonia meter 58b respectively measure a first ammonia concentration NH1 and a second ammonia concentration NH2. The first ammonia concentration NH1 and the second ammonia concentration NH2 are supplied to the control unit 9. The control unit 9 calculates a measured nitrification rate based on the supplied first ammonia concentration NH1 and second ammonia concentration NH2 (NH1>NH2). Specifically, the measured nitrification rate is calculated based on the following equation (11) from the ammonia concentration NH1 measured by the first ammonia meter 58a on the upstream side and the ammonia concentration NH2 on the downstream side thereof. It should be noted that, the measured nitrification rate corresponds to an absolute value of an inclination of a solid line shown in FIG. 11B, and in some cases, the measured nitrification rate may be different as shown by two solid lines according to the installation position of the nitrification rate meter 58.

$$\text{Measured nitrification rate} = \frac{NH1 - NH2}{\text{Treatment time } (\Delta t) \text{between pair of ammonia meters}} \quad (11)$$

Meanwhile, a final ammonia concentration (a target ammonia concentration) NH3 is preset as a target value of the water to be treated for each of various reaction tanks 2. The control unit 9 calculates a nitrification rate as a reference (a target nitrification rate) from the target ammonia concentration NH3 and the ammonia concentration NH1 measured at the position of the first ammonia meter 58a, and stores the reference nitrification rate in a recording area (not shown) of the control unit 9. The target nitrification rate is calculated based on Expression (12) below. The target nitrification rate corresponds to an absolute value of an inclination of a dotted line shown in FIG. 11B.

$$\text{Target nitrification rate} = \frac{NH1 - NH3}{\text{Treatment time } (\Delta T) \text{from first ammonia meter to outflow side}} \quad (12)$$

As shown in FIG. 11A, the control unit 9 controls the gas supply amount from the air diffuser unit 6 at least on an upstream side of the second ammonia meter 58b so that measured nitrification rate between the first ammonia meter 58a and the second ammonia meter 58b, that is the measured nitrification rate measured by the nitrification rate meter 58 falls below the target nitrification rate. Accordingly, progress of the nitrification reaction on the upstream side of the second ammonia meter 58b is suppressed to promote the denitrification reaction in this area. Furthermore, even if the measured nitrification rate is below the target nitrification rate, if the nitrification reaction occurs late, the ammonia concentration on the outflow side of the reaction tank 2 may not be decreased to the desired target ammonia concentration NH3. Therefore, according to the findings obtained by experiments performed by the present inventors, it is desirable that the measured nitrification rate is larger than half the target nitrification rate. That is, the control unit 9 controls the gas supply amount from the air diffuser unit 6 so that the following expression (13) is established.

$$0.5 < \frac{\text{Measured nitrification rate}}{\text{Target nitrification rate}} < 1.0 \quad (13)$$

Specifically, when the measured nitrification rate with respect to the target nitrification rate exceeds the range set by the expression (13), that is, when the measured nitrification rate is equal to or higher than the target nitrification rate, it means that the nitrification reaction proceeds too much. Therefore, the control unit 9 decreases the air supply amount from the air diffuser units 6a and 6b at least on the upstream side of the second ammonia meter 58b along the flow direction of the water to be treated in the reaction tank 2. Accordingly, the control unit 9 controls so that the nitrification reaction does not proceed too much in the reaction tank 2. On the other hand, when the measured nitrification rate with respect to the target nitrification rate falls below the range set by the expression (13), that is, when the measured nitrification rate is equal to or lower than half the target nitrification rate, it means that the nitrification reaction is suppressed too much. Therefore, the control unit 9 increases the air supply amount from the air diffuser units 6a and 6b at least on the upstream side of the second ammonia meter 58b along the flow direction of the water to be treated in the reaction tank 2. Accordingly, the control unit 9 controls so that the nitrification reaction is performed in the reaction tank 2 at a desired nitrification rate.

In the eighth modification described above, the control of the denitrification treatment executed by the nitrate meter in the embodiments described above is performed by using the pair of ammonia meters. Accordingly, while the aerobic nitrification bacteria and the facultative anaerobic denitrification bacteria are present together in the reaction tank 2, activities of these bacteria can be activated. Therefore, the nitrification reaction and the denitrification reaction can be performed together under favorable control.

A ninth modification is explained next. In the ninth modification, differently from the wastewater treatment apparatus according to the second embodiment shown in FIG. 5, a flowmeter is used as the denitrification confirming unit instead of the nitrate meter 7. The gas supply amount from the air diffuser units 6a and 6b on an upstream side of the flowmeter along a flow direction of the water to be treated and the denitrification state at each measurement value by the flowmeter are detected beforehand, and correlation data thereof is stored in a data table in the storage area (not shown) of the control unit 9. The control unit 9 performs an arithmetic operation with respect to the measured flow rate value based on the flow rate value supplied from the flowmeter and the data table stored in the control unit 9, to predict the state of the denitrification reaction. The control unit 9 then controls the gas supply amount from the air diffuser units 6a and 6b at least on the upstream side of the flowmeter based on the measured flow rate value. As the state of the denitrification reaction, the nitrate value, the DO concentration, the ORP value, or the nitrification rate can be adopted.

According to the ninth modification, the control unit 9 predicts the state of the denitrification reaction at least on the upstream side of the flowmeter based on the correlation between the flowmeter and the state of the denitrification reaction, and controls the gas supply amount from the air diffuser units 6a and 6b on the upstream side of the flowmeter. Accordingly, while the aerobic nitrification bacteria and the facultative anaerobic denitrification bacteria are present together in the reaction tank 2, activities of these bacteria can be activated. Therefore, the nitrification reaction and the denitrification reaction can be performed together under favorable control.

Although embodiments of the present invention have been specifically explained above, the present invention is not limited to the above embodiments, and it is possible to make various changes that are based on the technical concept of the present invention. For example, the values mentioned in one of the above embodiments are only examples and values different from these mentioned values can be used where necessary.

In the embodiments described above, biological treatment of wastewater by a so-called standard activated sludge method has been explained. However, the present invention is not limited to the method, and is applicable to various treatment methods using the aerobic tank. Specifically, the present invention is applicable to various wastewater treatment methods using the aerobic tank, such as an AO (anaerobic-aerobic) method, an $A_2O$ (anaerobic-anoxic-aerobic) method, a nitrification+endogenous denitrification method, a multi-step inflow-type nitrification-denitrification method, and a multi-step inflow-type $A_2O$ method.

Furthermore, as the reaction tank 2, a deep swirling-flow reaction tank having a depth of about 10 meters or a shallow reaction tank having a depth of about 5 meters can be adopted.

Further, in the embodiments described above, the nitrate meter, the dissolved oxygen (DO) analyzer, the oxidation-reduction potential meter (ORP meter), the ammonia meter, and the flowmeter are used as the denitrification confirming unit. However, the denitrification confirming unit is not limited to these instruments, and for example, a BOD meter, a COD meter, a TOC meter, an Rr meter, an ATU-Rr meter, and a UV meter can be adopted.

In the embodiments described above, the control unit and the gas supply-amount control unit are separate bodies. However, the control unit and the gas supply-amount control unit can be formed by the same control unit, or can be formed by three or more separate bodies having the same function.

In the sixth and seventh modifications described above, the DO analyzer and the ORP meter are installed in the swirling-flow reaction tank. However, the reaction tank is not limited to the swirling-flow reaction tank. So long as state where the denitrification area and the nitrification area are present together can be confirmed in the reaction tank 2, the formation of the denitrification area and the nitrification area can be controlled in the same manner as described above by using a pair of DO analyzers or a pair of ORP meters to measure the DO concentration or the ORP value in the denitrification area by one of the meters and measure the DO concentration or the ORP concentration in the nitrification area by the other meter. Furthermore, as in the reaction tank 2 explained in the fourth modification described above, in the reaction tank in which the denitrification area and the nitrification area are yielded alternately according to time, a measurement by the pair of DO analyzers or ORP meters can be performed by one DO analyzer or ORP meter.

In the sixth and seventh modifications described above, the reaction tank 2 according to the third embodiment is used, and in the eighth and ninth modifications, the reaction tank 2 according to the second embodiment is used. However, the reaction tank 2 according to the second to fifth modifications can be adopted in the sixth to ninth modifications. In this case, by installing the instrument to be installed in the denitrification area and the instrument to be installed in the nitrification area, respectively, in the nitrification area and the denitrification area, whose formation is ascertained in each reaction tank 2, effects identical to those in the first to third embodiments can be achieved.

In the eighth modification described above, the nitrification rate meter is formed of a plurality of ammonia meters, specifically, a pair of ammonia meters, and the nitrification rate meter is used to measure the nitrification rate in the water to be treated in the reaction tank 2. However, the nitrification rate meter is not necessarily limited to the pair of ammonia meters, and three or more ammonia meters can be adopted or various devices that can measure the nitrification rate can be adopted.

According to the wastewater treatment apparatus, the wastewater treatment method, the wastewater treatment system, the control device, the control method, and the program stored in a non-transitory computer-readable recording medium of the present invention, the gas supply amount can be appropriately controlled according to the loading of the nitrogen-containing water flowing into the reaction tank where aeration is performed, and an appropriate amount of oxygen can be supplied to the reaction tank. Furthermore, denitrification treatment can be appropriately controlled, and the quality of treated water can be improved by improving the nitrogen removal rate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wastewater treatment apparatus comprising:
a reaction tank that includes an upstream-side zone provided on an upstream side of the reaction tank and a downstream-side zone provided on a downstream side of the reaction tank;
an air diffusing unit that is provided in the reaction tank and supplies gas to nitrogen-containing water throughout substantially a whole area in a flow direction of the nitrogen-containing water in the reaction tank, so that ammonia contained in the nitrogen-containing water is nitrified to nitrate according to a flow of the nitrogen-containing water through the reaction tank, and the nitrate is denitrified at each position along the flow direction;
a denitrification confirming unit provided at a halfway position of the reaction tank along the flow direction of the nitrogen-containing water between the upstream-side zone where a nitrification treatment and a denitrification treatment are processed and the downstream-side zone where the nitrification treatment and the denitrification treatment are processed, which follows the upstream-side zone on a downstream side thereof, to confirm whether the nitrate generated at the halfway position has been denitrified; and
a gas supply-amount control unit that controls a gas supply amount from the air diffusing unit at least on an upstream side of the denitrification confirming unit along the flow direction of the nitrogen-containing water, so that a desired proportion of the nitrate is denitrified at the halfway position, based on the denitrification state confirmed by the denitrification confirming unit, wherein
a reaction rate of the nitrification treatment and the denitrification treatment in the downstream-side zone is different from the reaction rate of the nitrification treatment and the denitrification treatment in the upstream-side zone, and
the halfway position of the reaction tank corresponds to a reaction rate change between the reaction rate in the downstream-side zone and the reaction rate in the upstream-side zone.

2. The wastewater treatment apparatus according to claim 1, wherein the air diffusing unit is configured to supply gas to sequentially, alternately, or repeatedly form an area where nitrification reaction is performed and an area where denitrification reaction is performed, with passage of time or according to the flow direction of the nitrogen-containing water.

3. The wastewater treatment apparatus according to claim 1, wherein when denitrification of the desired proportion of nitrate generated by nitrification by the nitrification reaction cannot be confirmed by the denitrification confirming unit, the gas supply-amount control unit executes control to increase or decrease the gas supply amount from the air diffusing unit at least on the upstream side of the denitrification confirming unit along the flow direction of the nitrogen-containing water.

4. The wastewater treatment apparatus according to claim 1, wherein the denitrification confirming unit is a nitrate concentration measuring unit configured to measure a nitrate concentration, and performs confirmation of whether the desired proportion of nitrate has been denitrified by measuring the nitrate concentration, and the gas supply-amount control unit controls the gas supply amount from the air diffusing unit at least on the upstream side of the nitrate concentration measuring unit along the flow direction of the nitrogen-containing water, so that the nitrate concentration measured by the nitrate concentration measuring unit falls within a predetermined range.

5. The wastewater treatment apparatus according to claim 1, wherein the gas supply-amount control unit controls the air diffusing unit so that the gas supply amount from the air diffusing unit becomes substantially uniform, at least on the upstream side of the denitrification confirming unit along the flow direction of the nitrogen-containing water.

6. The wastewater treatment apparatus according to claim 1, wherein the gas supply-amount control unit controls the air diffusing unit so that the gas supply amount from the air diffusing unit becomes substantially uniform throughout the whole area in the flow direction of the nitrogen-containing water.

7. The wastewater treatment apparatus according to claim 1, wherein an anaerobic tank is provided in a front stage of the reaction tank.

8. The wastewater treatment apparatus according to claim 1, wherein the gas supply-amount control unit controls the nitrification treatment and the denitrification treatment in the upstream-side zone, by controlling a gas supply amount from the air diffusion unit at least on an upstream side of the denitrification confirming unit along the flow direction of the nitrogen-containing water based on the denitrification state confirmed by the denitrification confirming unit.

9. The wastewater treatment apparatus according to claim 1, wherein the processing speed of the nitrification treatment in the downstream-side zone is faster than the processing speed of the denitrification treatment in the downstream-side zone.

10. The wastewater treatment apparatus according to claim 9, wherein the processing speed ratio of the denitrification treatment to the nitrification treatment in the upstream side zone is higher than the processing speed ratio of the denitrification treatment to the nitrification treatment in the downstream side zone.

11. The wastewater treatment apparatus according to claim 1 wherein, the gas supply-amount control unit controls the gas supply amount from the air diffusion unit so that the nitrate concentration detected by the denitrification confirming unit is within the preset range 5.0 mg/L or below.

12. A wastewater treatment method comprising:
a biological treatment step of performing biological treatment by nitrification reaction and denitrification reaction with respect to nitrogen-containing water flowing in a reaction tank;
an air diffusing step of supplying gas to the nitrogen-containing water throughout substantially a whole area in a flow direction of the nitrogen-containing water, so that ammonia contained in the nitrogen-containing water is nitrified to nitrate according to a flow of the nitrogen-containing water, and the nitrate is denitrified at each position along the flow direction;

a denitrification confirming step of confirming a denitrification state whether a desired proportion of the nitrate has been denitrified at a halfway position along the flow direction of the nitrogen-containing water between an upstream-side zone where a nitrification treatment and a denitrification treatment are processed at a first reaction rate and a downstream-side zone where the nitrification treatment and the denitrification treatment are processed at a second reaction rate, which follows the upstream-side zone on a downstream side thereof;

a gas supply-amount control step of controlling a gas supply amount at least on an upstream side of the halfway position along the flow direction of the nitrogen-containing water, so that the desired proportion of the nitrate is denitrified at the halfway position based on the denitrification state confirmed at the denitrification confirming step, wherein the denitrification state is confirmed at the halfway position along the flow direction of the nitrogen-containing water based on the first reaction rate and the second reaction rate.

13. The wastewater treatment method according to claim 12, wherein gas is supplied to the nitrogen-containing water to sequentially, alternately, or repeatedly form an area where nitrification reaction is performed and an area where denitrification reaction is performed, with passage of time or according to the flow direction of the nitrogen-containing water.

14. The wastewater treatment method according to claim 12, wherein the proportion of nitrate confirmed at the denitrification confirming step is a nitrate concentration at the halfway position, and at the gas supply-amount control step, the gas supply amount at least on the upstream side of the halfway position along the flow direction of the nitrogen-containing water is controlled in a direction in which the nitrate concentration measured at the denitrification confirming step falls within a predetermined range.

15. A wastewater treatment system comprising:
a reaction tank that includes an upstream-side zone provided on an upstream side of the reaction tank and a downstream-side zone provided on a downstream side of the reaction tank;
a denitrification confirming unit provided at a halfway position of the reaction tank along a flow direction of nitrogen-containing water in the reaction tank between the upstream-side zone where a nitrification treatment and a denitrification treatment are processed and the downstream-side zone where the nitrification treatment and the denitrification treatment are processed, which follows the upstream-side zone on a downstream side thereof, to confirm a denitrification state whether a desired proportion of nitrate has been denitrified at the halfway position with respect to the nitrogen-containing water to which gas is supplied throughout substantially a whole area in the flow direction, so that ammonia contained in the nitrogen-containing water is nitrified to nitrate according to the flow direction and each desired proportion of nitrate is denitrified at each position along the flow direction; and
a gas supply-amount control unit that controls a gas supply amount to be supplied to the nitrogen-containing water at least on an upstream side of the denitrification confirming unit along the flow direction of the nitrogen-containing water, so that the desired proportion of nitrate is denitrified at the halfway position, based on the denitrification state confirmed by the denitrification confirming unit, wherein a reaction speed ratio of the nitrification treatment and the denitrification treatment in the downstream-side zone is different from the reaction speed ratio of the nitrification treatment and the denitrification treatment in the upstream-side zone, and the halfway position of the reaction tank corresponds to a reaction rate change between the reaction rate in the downstream-side zone and the reaction rate in the upstream-side zone.

16. A control device controls a gas supply amount with respect to an air diffusing unit that is provided in a reaction tank and supplies gas to nitrogen-containing water throughout substantially a whole area in a flow direction of the nitrogen-containing water in the reaction tank, so that ammonia contained in the nitrogen-containing water is nitrified to nitrate according to the flow of the nitrogen-containing water, and the nitrate is denitrified at each position along the flow direction, at least on an upstream side along the flow direction of the nitrogen-containing water than a denitrification confirming unit that is provided at a halfway position of the reaction tank along the flow direction of the nitrogen-containing water between an upstream-side zone where a nitrification treatment and a denitrification treatment are processed and a downstream-side zone where the nitrification treatment and the denitrification treatment are processed, which follows the upstream-side zone on a downstream side thereof, to confirm a denitrification state on whether a desired proportion of nitrate has been denitrified at the halfway position, so that the desired proportion of nitrate is denitrified at the halfway position based on the denitrification state at the halfway position confirmed by the denitrification confirming unit, wherein a reaction speed ratio of the nitrification treatment and the denitrification treatment in the downstream-side zone is different from the reaction speed ratio of the nitrification treatment and the denitrification treatment in the upstream-side zone, and the halfway position of the reaction tank corresponds to a reaction rate change between the reaction rate in the downstream-side zone and the reaction rate in the upstream-side zone.

17. A control method performed by a control device that controls a gas supply amount with respect to nitrogen-containing water, the control method comprising:
a denitrification confirming step of confirming a denitrification state whether nitrate has been denitrified with respect to the nitrogen-containing water to which gas is supplied throughout substantially a whole area in a flow direction of the nitrogen-containing water, so that ammonia contained in the nitrogen-containing water is nitrified to nitrate according to the flow direction at a halfway position along the flow direction of the nitrogen-containing water between an upstream-side zone where a nitrification treatment and a denitrification treatment are processed and a downstream-side zone where the nitrification treatment and the denitrification treatment are processed, which follows the upstream-side zone on a downstream side thereof, and the nitrate is denitrified at each position along the flow direction; and
a gas supply-amount control step of controlling a gas supply amount to be supplied to the nitrogen-containing water at least on an upstream side of the halfway position along the flow direction of the nitrogen-containing water, so that a desired proportion of nitrate is denitrified at the halfway position based on the denitrification state confirmed at the denitrification confirming step, wherein a reaction speed ratio of the nitrification treatment and the denitrification treatment in the downstream-side zone is different from the reaction speed ratio of the nitrification treatment and the denitrification treatment in the upstream-side zone, and the halfway position of the reaction tank corresponds to a reaction rate change between the reaction rate in the downstream-side zone and the reaction rate in the upstream-side zone.

18. A non-transitory computer-readable recording medium that stores a program that causes a computer to execute:

a denitrification confirming step of confirming a denitrification state whether nitrate has been denitrified with respect to nitrogen-containing water to which gas is supplied throughout substantially a whole area in a flow direction of the nitrogen-containing water, so that ammonia contained in the nitrogen-containing water is nitrified to nitrate according to the flow direction at a halfway position of a reaction tank along the flow direction of the nitrogen-containing water between an upstream-side zone where a nitrification treatment and a denitrification treatment are processed and a downstream-side zone where the nitrification treatment and the denitrification treatment are processed, which follows the upstream-side zone on a downstream side thereof, and the nitrate is denitrified at each position along the flow direction; and a gas supply-amount control step of controlling a gas supply amount to be supplied to the nitrogen-containing water at least on an upstream side of the halfway position along the flow direction of the nitrogen-containing water, so that a desired proportion of nitrate is denitrified at the halfway position based on the denitrification state confirmed at the denitrification confirming step, wherein a reaction speed ratio of the nitrification treatment and the denitrification treatment in the downstream-side zone is different from the reaction speed ratio of the nitrification treatment and the denitrification treatment in the upstream-side zone, and the halfway position of the reaction tank corresponds to a reaction rate change between the reaction rate in the downstream-side zone and the reaction rate in the upstream-side zone.

\* \* \* \* \*